US012185346B2

(12) United States Patent
Jang et al.

(10) Patent No.: US 12,185,346 B2
(45) Date of Patent: Dec. 31, 2024

(54) TECHNIQUE FOR MULTIPLE FRAME TRANSMISSION IN WIRELESS COMMUNICATION SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Suhwook Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 373 days.

(21) Appl. No.: 17/753,100

(22) PCT Filed: Sep. 4, 2020

(86) PCT No.: PCT/KR2020/011947

§ 371 (c)(1),
(2) Date: Feb. 18, 2022

(87) PCT Pub. No.: WO2021/045563

PCT Pub. Date: Mar. 11, 2021

(65) Prior Publication Data

US 2022/0279531 A1 Sep. 1, 2022

(30) Foreign Application Priority Data

Sep. 5, 2019 (KR) ........................ 10-2019-0110371

(51) Int. Cl.
*H04W 72/54* (2023.01)
*H04W 4/40* (2018.01)
(Continued)

(52) U.S. Cl.
CPC ....... *H04W 72/54* (2023.01); *H04W 74/0808* (2013.01); *H04W 4/40* (2018.02); *H04W 84/12* (2013.01)

(58) Field of Classification Search
CPC ... H04W 72/54; H04W 74/0808; H04W 4/40; H04W 84/12; H04W 80/02
See application file for complete search history.

(56) References Cited

U.S. PATENT DOCUMENTS 11,432,119 B2 * 8/2022 Cariou .................... H04W 4/40
2008/0095091 A1 * 4/2008 Surineni ........... H04W 52/0225 370/311
(Continued)

OTHER PUBLICATIONS

PCT International Application No. PCT/KR2020/011947, International Search Report dated Nov. 30, 2020, 2 pages.
(Continued)

*Primary Examiner* — Habte Mered
(74) *Attorney, Agent, or Firm* — LEE, HONG, DEGERMAN, KANG & WAIMEY

(57) ABSTRACT

One embodiment according to the present specification relates to a technique for multiple frame transmission in a wireless LAN (WLAN) system. A transmission STA can transmit a first next generation V2X physical protocol data unit (NGV PPDU) from among a plurality of NGV PPDUs for a multiple frame transmission mode. Afterwards, the transmission STA can identify a channel state for the transmission of a second NGV PPDU from among the plurality of NGV PPDUs. The transmission STA can determine, on the basis of the channel state, whether to transmit the second NGV PPDU.

6 Claims, 36 Drawing Sheets

(51) Int. Cl.
*H04W 74/0808* (2024.01)
*H04W 84/12* (2009.01)

(56) References Cited

U.S. PATENT DOCUMENTS

| | | | | |
|---|---|---|---|---|
| 2018/0092127 | A1* | 3/2018 | Park | H04W 72/0453 |
| 2019/0045444 | A1* | 2/2019 | Huang | H04W 76/28 |
| 2020/0344582 | A1* | 10/2020 | Kenney | H04L 1/004 |
| 2021/0014018 | A1* | 1/2021 | Noh | H04L 5/0042 |
| 2021/0014112 | A1* | 1/2021 | Sadeghi | H04L 41/0803 |
| 2021/0219109 | A1* | 7/2021 | Cariou | H04L 27/2603 |
| 2022/0141785 | A1* | 5/2022 | Gan | H04W 74/0808 370/350 |
| 2022/0225406 | A1* | 7/2022 | Kim | H04W 74/0866 |
| 2022/0295546 | A1* | 9/2022 | Kim | H04W 74/085 |

OTHER PUBLICATIONS

Jang, et al., "20MHz Channel Access in 11bd: Follow-up," IEEE 802.11-19/1103r0, Jul. 2019, 21 pages.
Lim, et al., "PHY designs for 11bd," IEEE 802.11-19/332r2, Mar. 2019, 26 pages.
Sun, et al., "Motion Booklet for IEEE 802.11 TGbd," IEEE 802.11-19/0514r6, Mar. 2019, 33 pages.
Gwak, et al., "Consideration on 20MHz Channel Access in 11bd," IEEE 802.11-19/0807r1, May 2019, 16 pages
Hong, et al., "Channel usage in NGV: follow-up," IEEE 802.11-19/0809r1, May 2019, 16 pages.

* cited by examiner (a)

(b)

TECHNIQUE FOR MULTIPLE FRAME TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2020/011947, filed on Sep. 4, 2020, which claims the benefit of earlier filing date and right of priority to Korean Application No. 10-2019-0110371 filed on Sep. 5, 2019, the contents of which are all hereby incorporated by reference herein in their entireties.

BACKGROUND OF THE DISCLOSURE

Field of the Disclosure

The present specification relates to a technique for multi-frame transmission in a wireless LAN system, and more particularly, to a method for preventing collision during multi-frame transmission in a wireless LAN system, and an apparatus supporting the same.

Related Art

Wireless network technologies may include various types of wireless local area networks (WLANs). WLAN employs widely used networking protocols and can be used to interconnect nearby devices together. The various technical features described in the present specification can be applied to any communication standard, such as WiFi or, more generally, any one of the IEEE 802.11 radio protocol family.

The present specification either enhances the conventional (or existing) IEEE 802.11p specification or proposes technical characteristics that can be used in a new communication standard. The new communication standard may be a Next Generation Vehicular/V2x (NGV) standard, which is currently being discussed.

SUMMARY

The NGV standard (i.e., 802.11bd standard) may support various modes. Multiple frame transmission may be supported in OCB broadcast and OCB unicast. When transmitting multiple frames, collisions between frames may occur. Accordingly, a method for preventing collision between frames in a transmitting STA and a receiving STA may be required.

According to various embodiments, a transmitting station (STA) may perform: transmitting a first Next Generation V2X (NGV) Physical Protocol Data Unit (PPDU) among a plurality of NGV PPDUs configured for a multiple-frame transmission mode; after transmitting the first NGV PPDU, identifying a channel state for transmission of a second NGV PPDU among the plurality of NGV PPDUs; and determining whether to transmit the second NGV PPDU based on the channel state, wherein the plurality of NGV PPDUs are transmitted through a 5.9 GHz band based on a frequency spacing of 156.25 kHz in the multi-frame transmission mode.

Advantageous Effects

The present specification proposes technical features supporting a situation in which the 5.9 GHz band is used in various WLAN systems (e.g., IEEE 802.11bd systems). Based on various examples of the present specification, throughput improvement and high speed of Dedicated Short Range Communication (DSRC) (802.11p) may be supported for smooth V2X support in the 5.9 GHz band.

According to an example of the present specification, the transmitting STA may support a multi-frame transmission mode. The transmitting STA may transmit a first NGV PPDU among a plurality of NGV PPDUs for the multi-frame transmission mode. Thereafter, the transmitting STA may check the channel state for transmission of the second NGV PPDU among the plurality of NGV PPDUs. Based on the channel state, the transmitting STA may determine whether to transmit the second NGV PPDU.

Accordingly, according to an example of the present specification, the transmitting STA may identify the channel state when transmitting the second NGV PPDU for the multi-frame transmission mode. The transmitting STA may cancel transmission of the second NGV PPDU based on the busy state of the channel state for the second NGV PPDU.

Accordingly, according to an example of the present specification, when transmitting an NGV PPDU through the multi-frame transmission mode, the transmitting STA may first check the channel state, thereby reducing collisions between frames.

DETAILED DESCRIPTION

Figure 1:
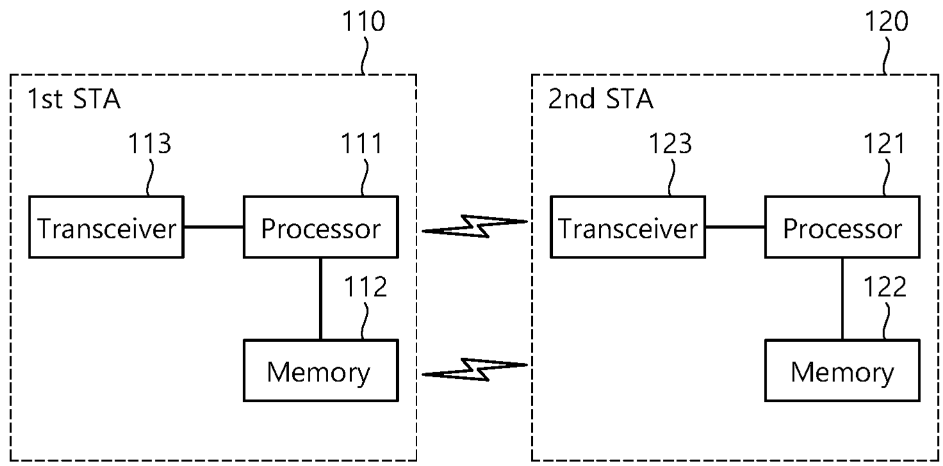
FIG. 1 shows an example of a transmitting apparatus and/or receiving apparatus of the present specification.
Figure 1:
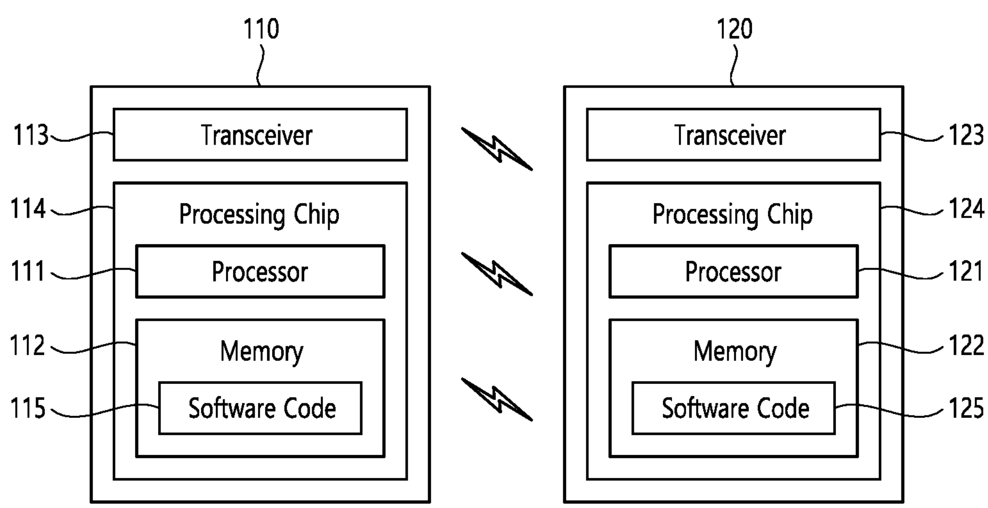

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
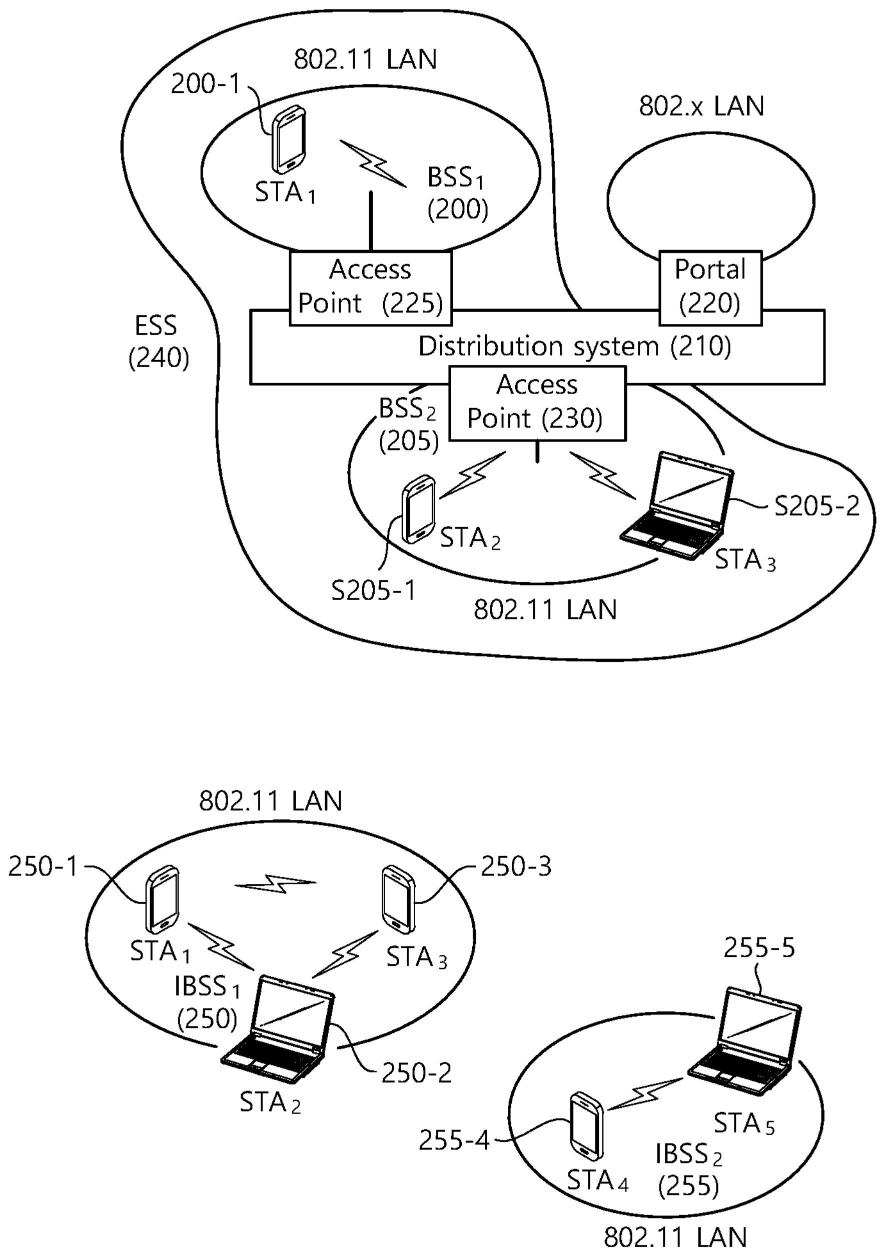
FIG. 2 is a conceptual view illustrating the structure of a wireless local area network (WLAN).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
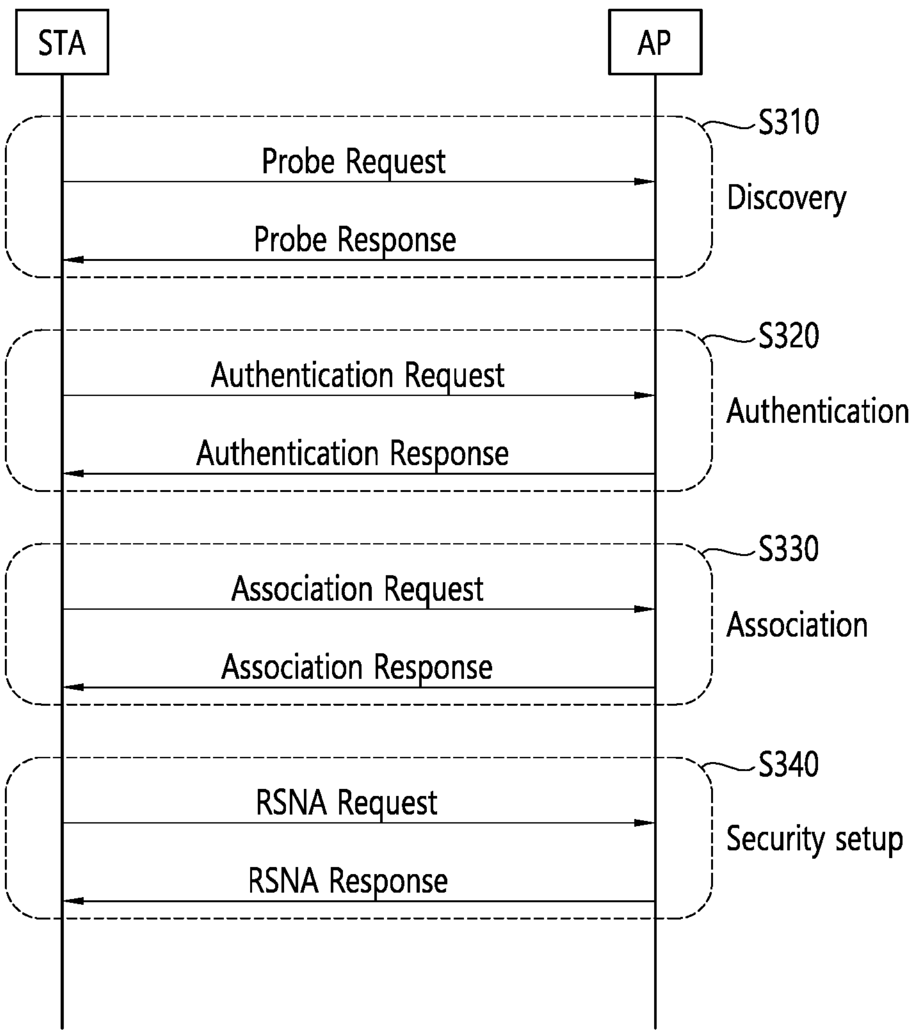
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
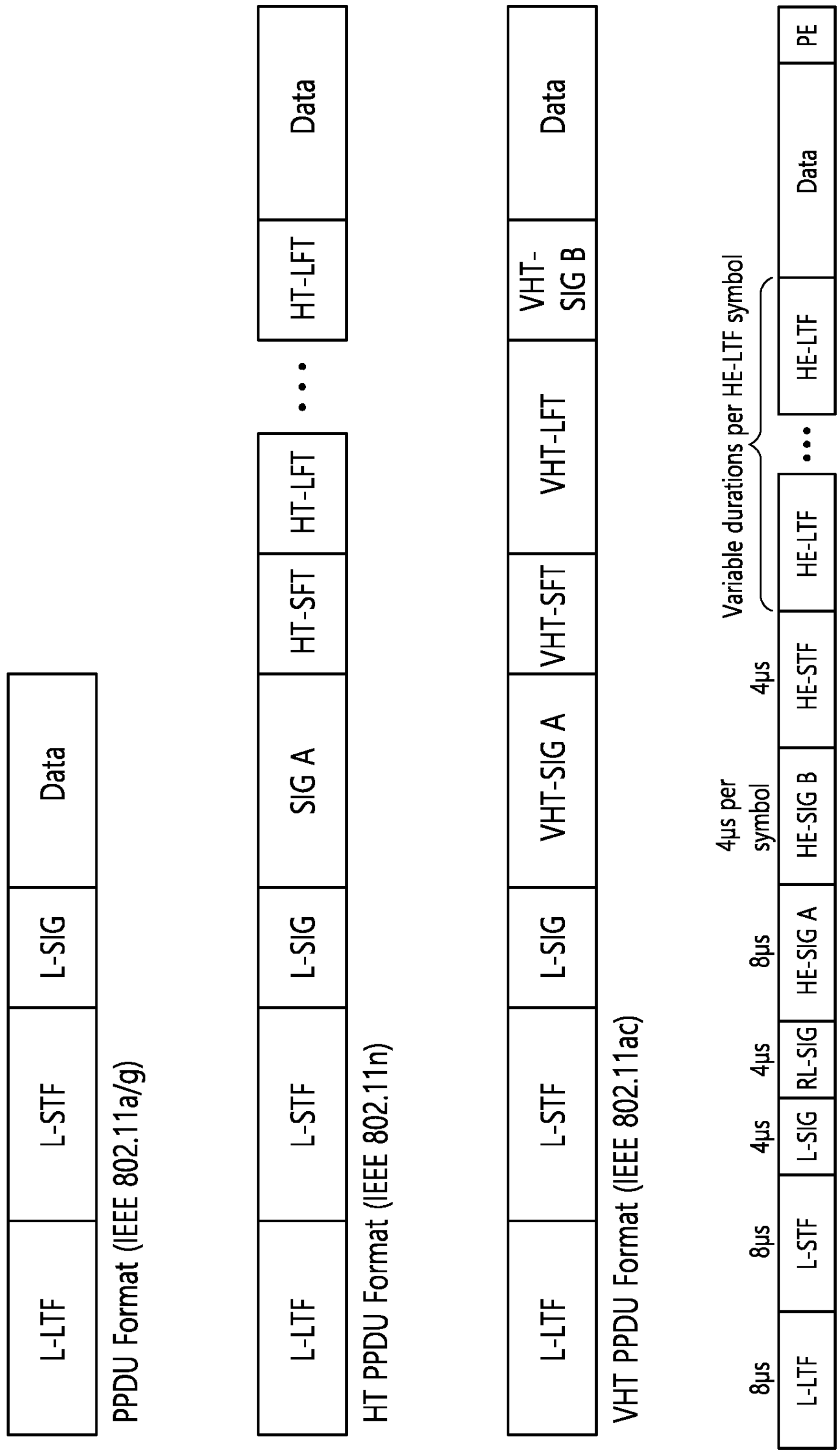
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
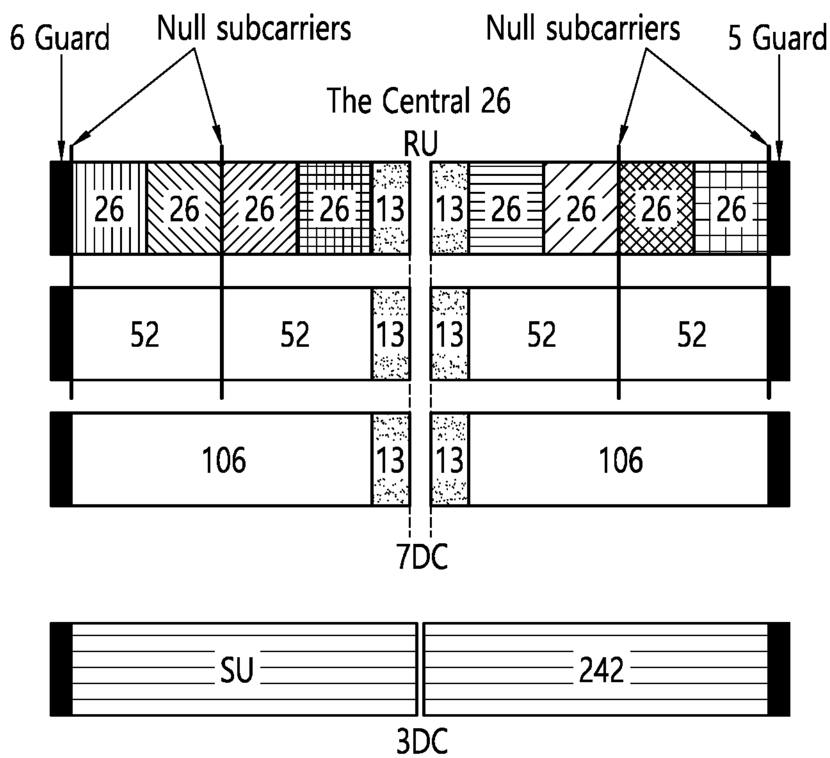
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
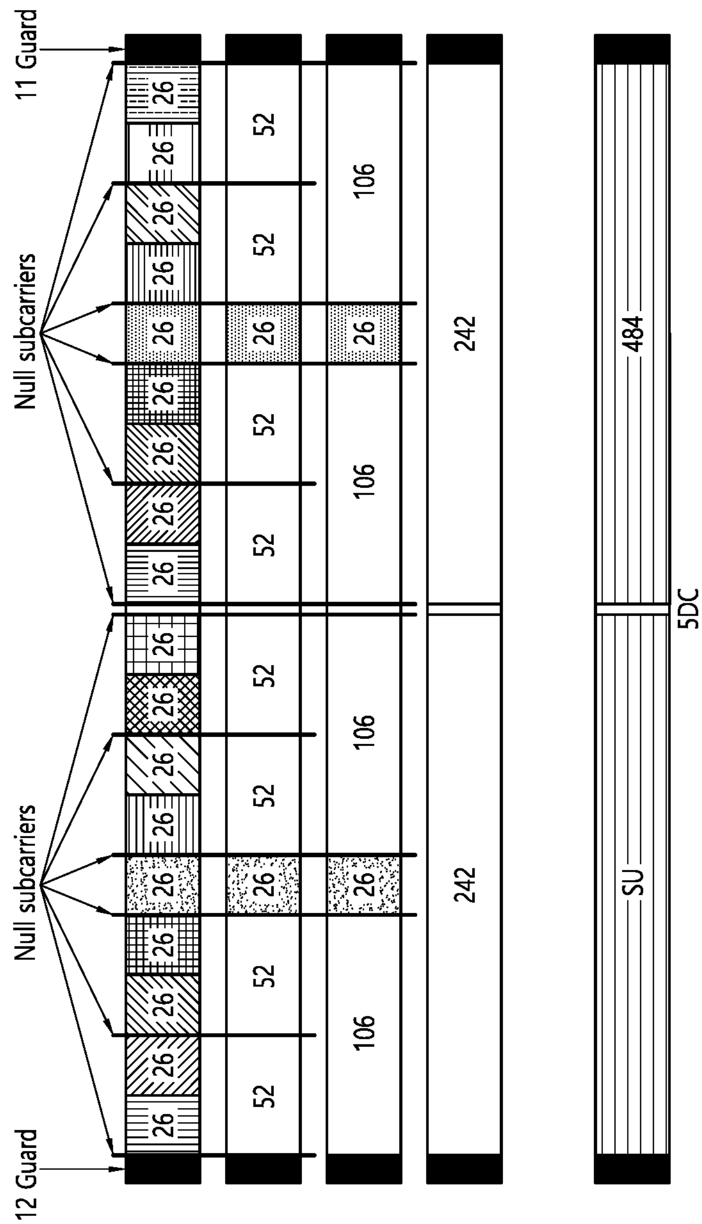
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
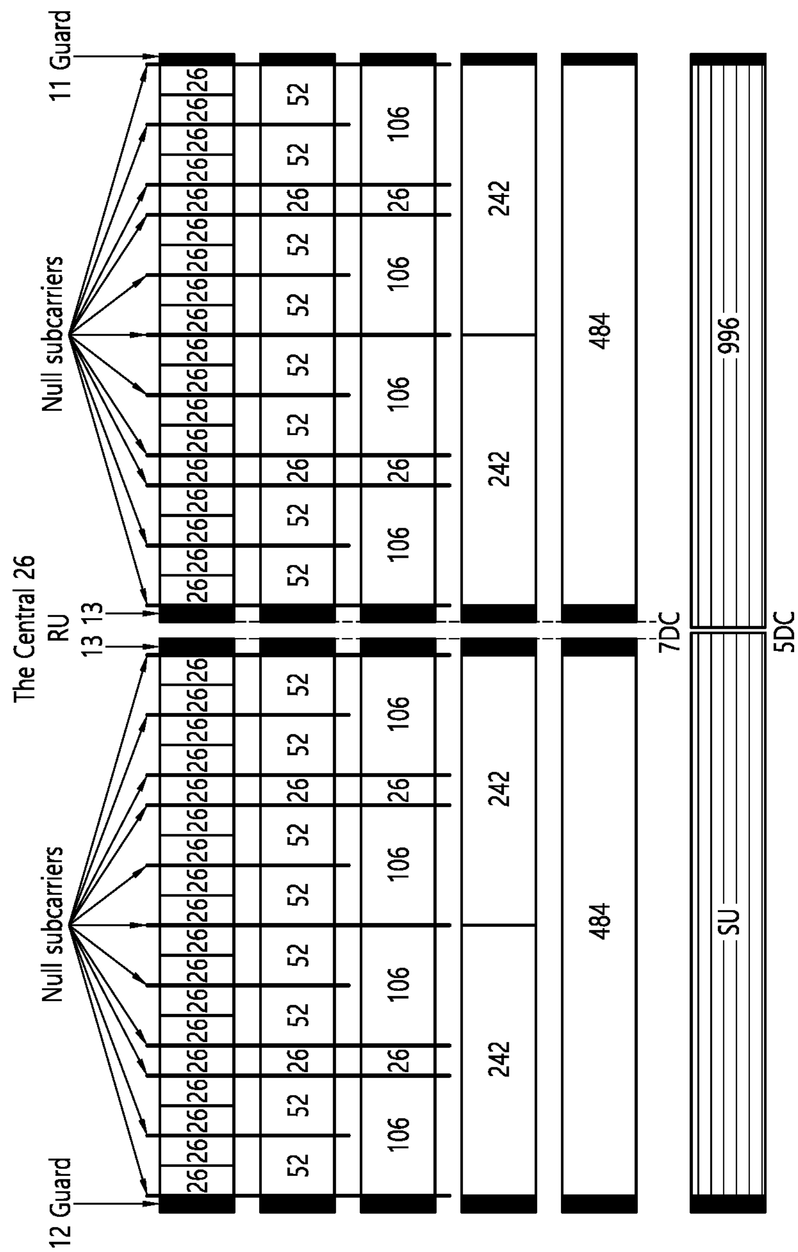
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
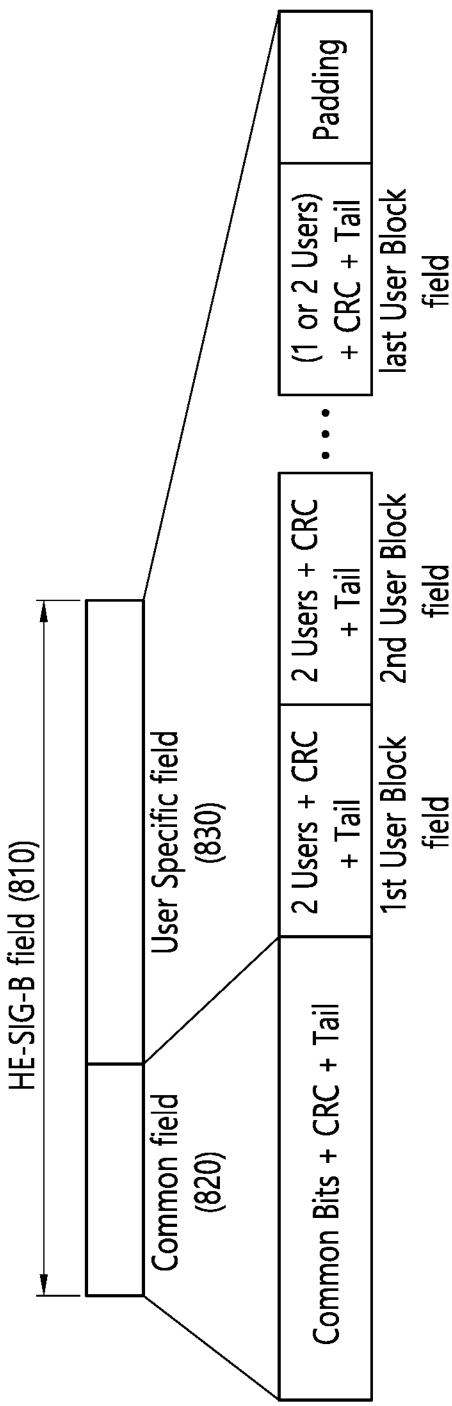
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | 106 | | | | 26 | 26 | 26 | 26 | 26 | 8 |
| $01001y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
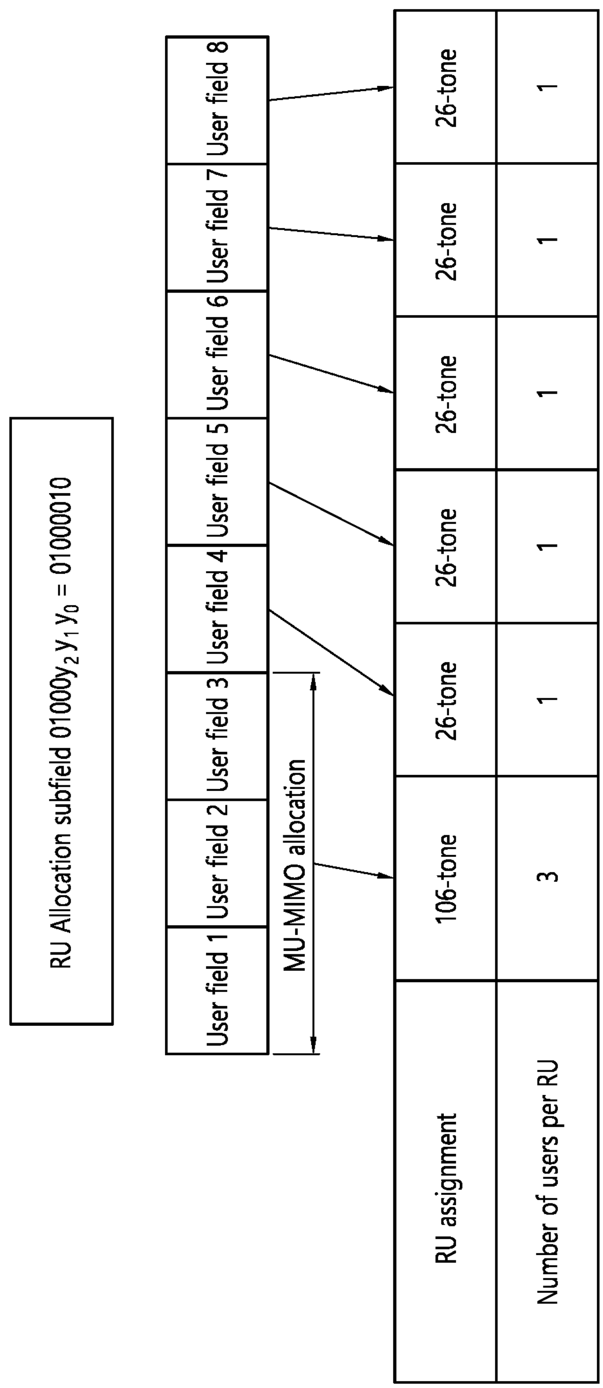
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 . . . B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 . . . B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
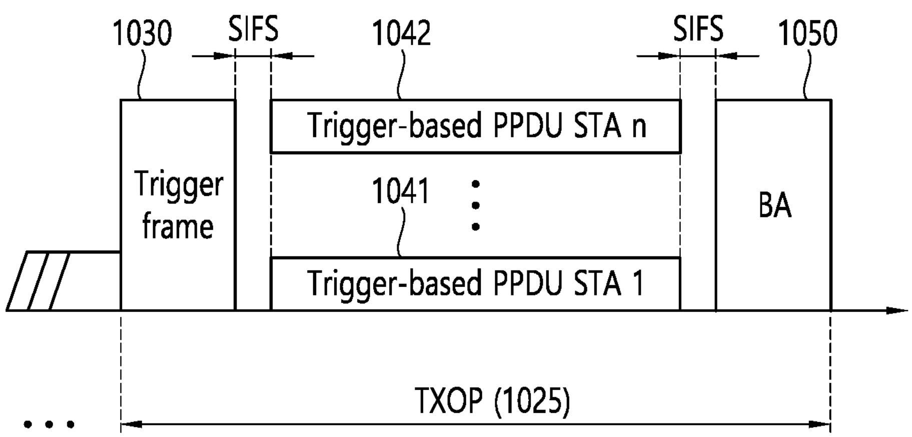
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
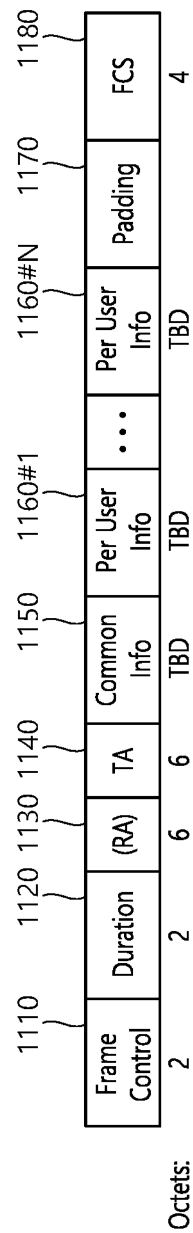
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
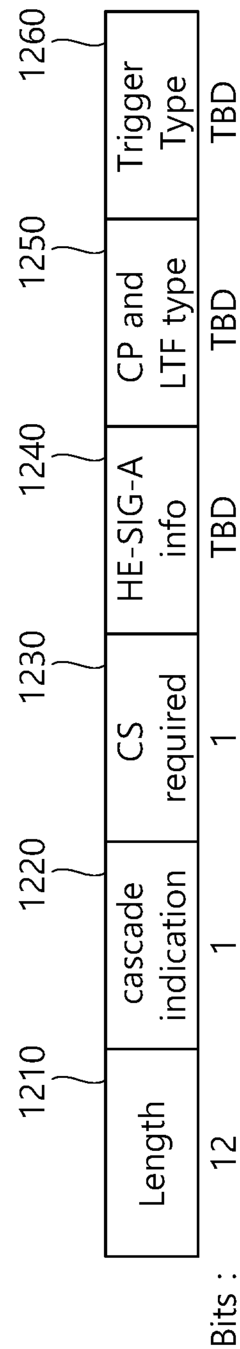
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
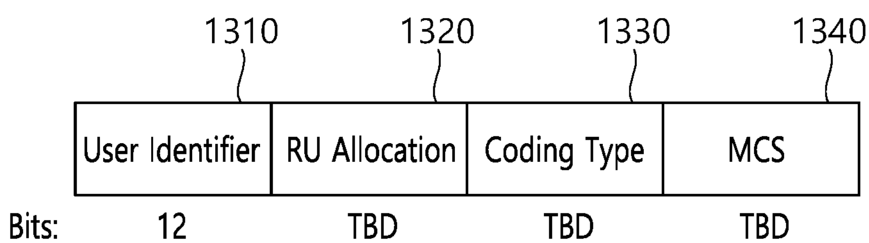
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
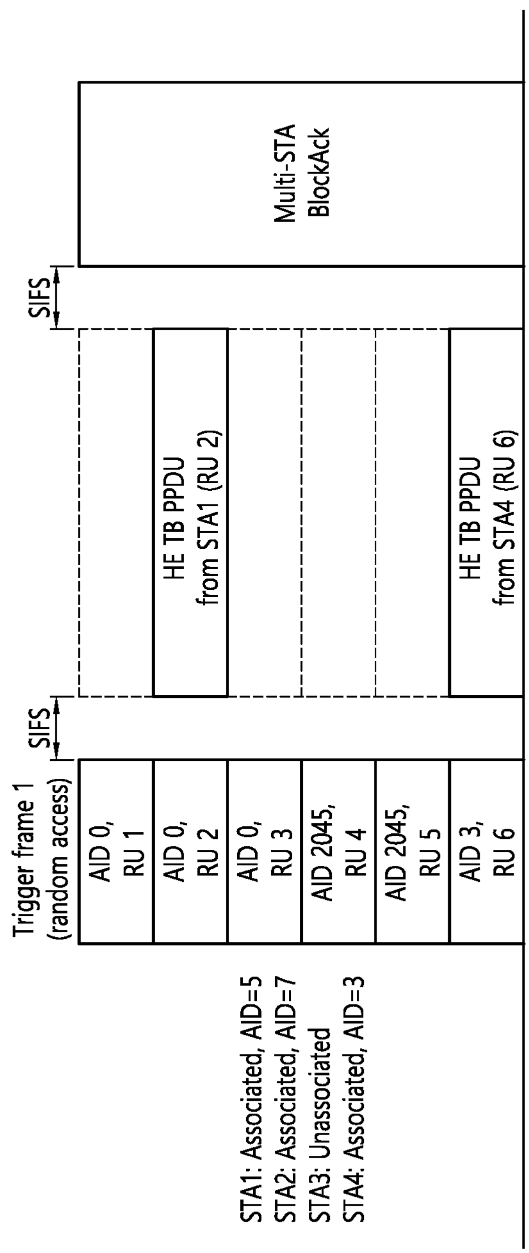
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
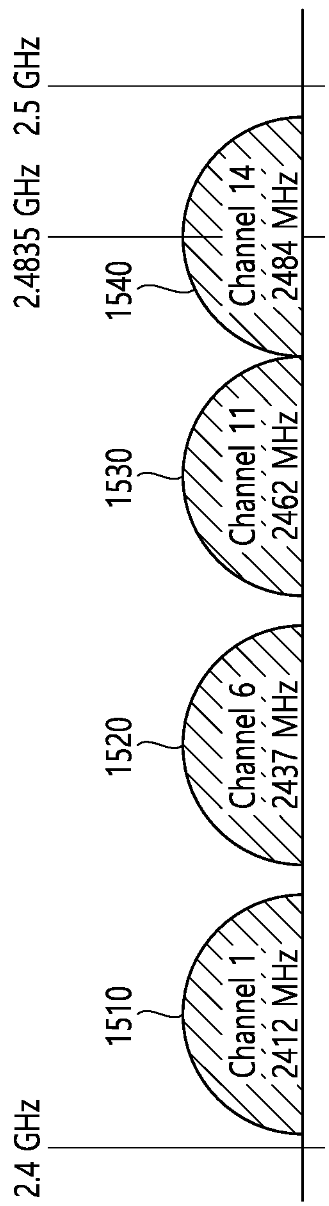
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
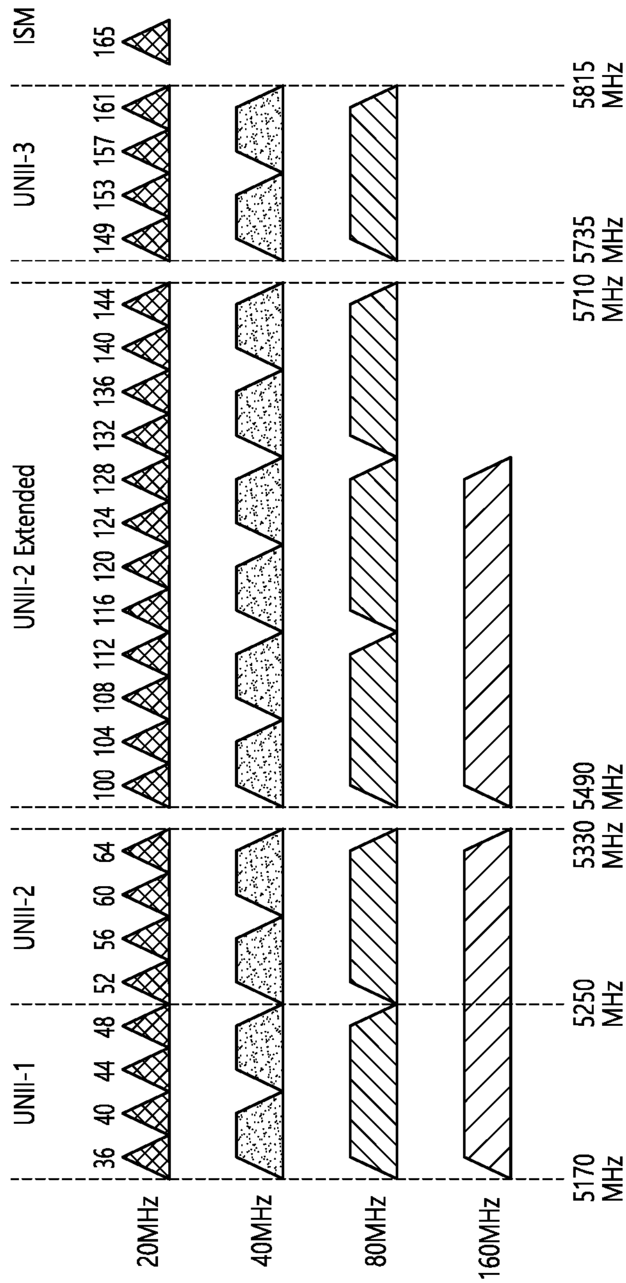
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNIT Low. The UNII-2 may include a frequency domain called UNIT Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
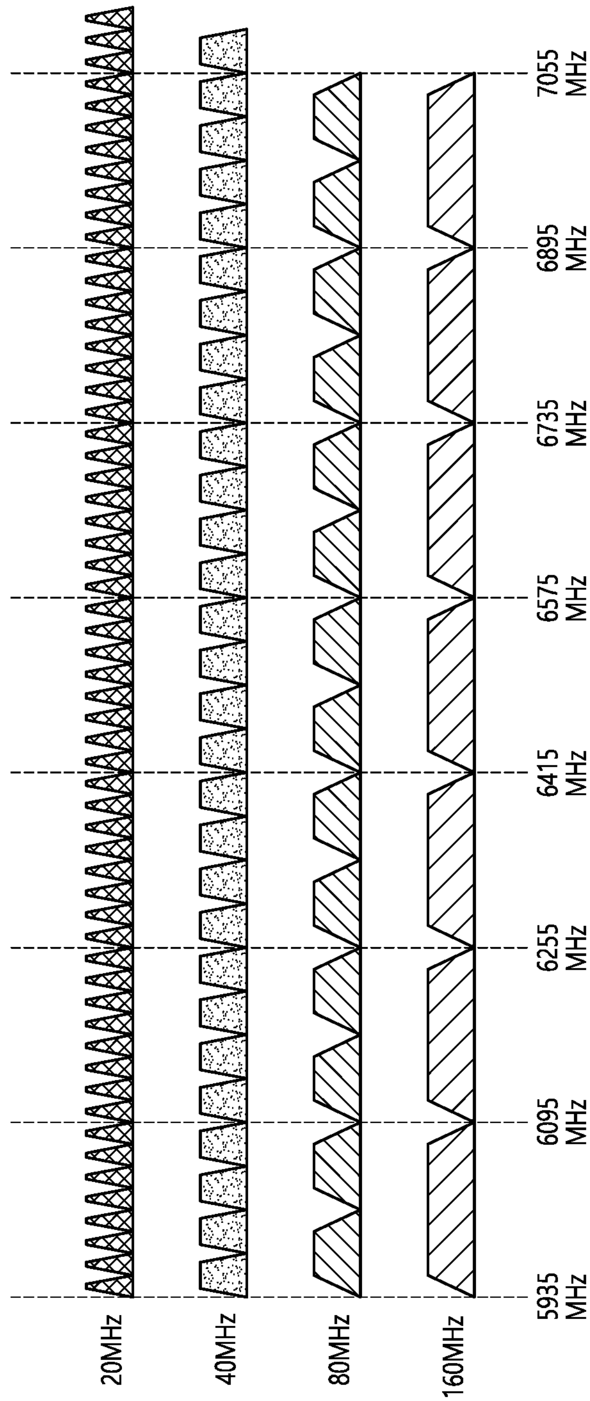
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
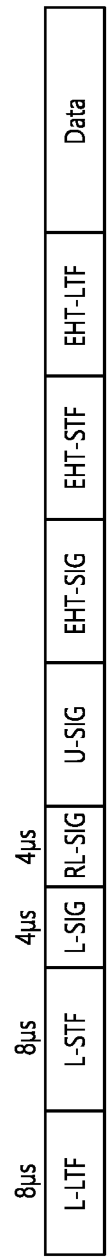
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) regarding whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) ‘a’ to a tone index ‘c’. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112:16:112)=\{M\}*(1+j)/sqrt(2) \quad \text{<Equation 2>}$$

EHT-STF(0)=0

The EHT-STF for the 40 MHz PPDU may be configured based on the following equation. The following example may be the first type (i.e., 1×STF) sequence.

$$EHT\text{-}STF(-240:16:240)=\{M,0,-M\}*(1+j)/sqrt(2) \quad \text{<Equation 3>}$$

The EHT-STF for the 80 MHz PPDU may be configured based on the following equation. The following example may be the first type (i.e., 1×STF) sequence.

$$EHT\text{-}STF(-496:16:496)=\{M,1,-M,0,-M,1,-M\}*(1+j)/sqrt(2) \quad \text{<Equation 4>}$$

The EHT-STF for the 160 MHz PPDU may be configured based on the following equation. The following example may be the first type (i.e., 1×STF) sequence.

$$EHT\text{-}STF(-1008:16:1008)=\{M,1,-M,0,-M,1,-M,0,-M,-1,M,0,-M,1,-M\}*(1+j)/sqrt(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496:16:496)=\{-M,-1,M,0,-M,1,-M\}*(1+j)/sqrt(2) \quad \text{<Equation 6>}$$

Equation 7 to Equation 11 below relate to an example of a second type (i.e., 2×STF) sequence.

$$EHT\text{-}STF(-120:8:120)=\{M,0,-M\}*(1+j)/sqrt(2) \quad \text{<Equation 7>}$$

The EHT-STF for the 40 MHz PPDU may be configured based on the following equation.

$$EHT\text{-}STF(-248:8:248)=\{M, -1, -M, 0, M, -1, M\}*(1+j)/sqrt(2)$$ <Equation 8>

EHT-STF(−248)=0

EHT-STF(248)=0

The EHT-STF for the 80 MHz PPDU may be configured based on the following equation.

$$EHT\text{-}STF(-504:8:504)=\{M, -1, M, -1, -M, -1, M, 0, -M, 1, M, 1, -M, 1, -M\}*(1+j)/sqrt(2)$$ <Equation 9>

The EHT-STF for the 160 MHz PPDU may be configured based on the following equation.

$$EHT\text{-}STF(-1016:16:1016)=\{M, -1, M, -1, -M, -1, M, 0, -M, 1, M, 1, -M, 1, -M, 0, -M, 1, -M, 1, M, 1, -M, 0, -M, 1, M, 1, -M, 1, -M\}*(1+j)/sqrt(2)$$ <Equation 10>

EHT-STF(−8)=0, EHT-STF(8)=0,

EHT-STF(−1016)=0, EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504:8:504)=\{-M, 1, -M, 1, M, 1, -M, 0, -M, 1, M, 1, -M, 1, -M\}*(1+j)/sqrt(2)$$ <Equation 11>

EHT-STF(−504)=0,

EHT-STF(504)=0

The EHT-LTF may have first, second, and third types (i.e., 1×, 2×, 4× LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
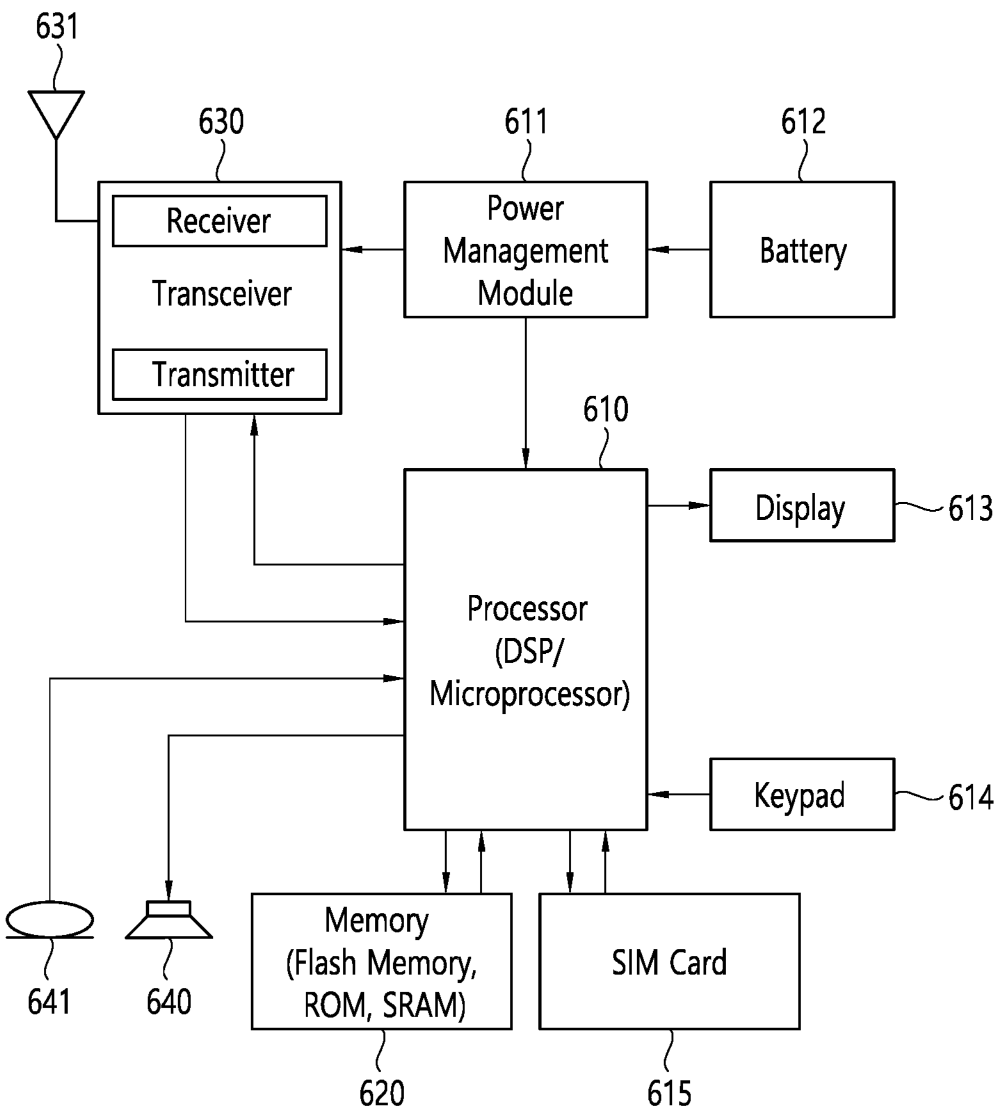
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
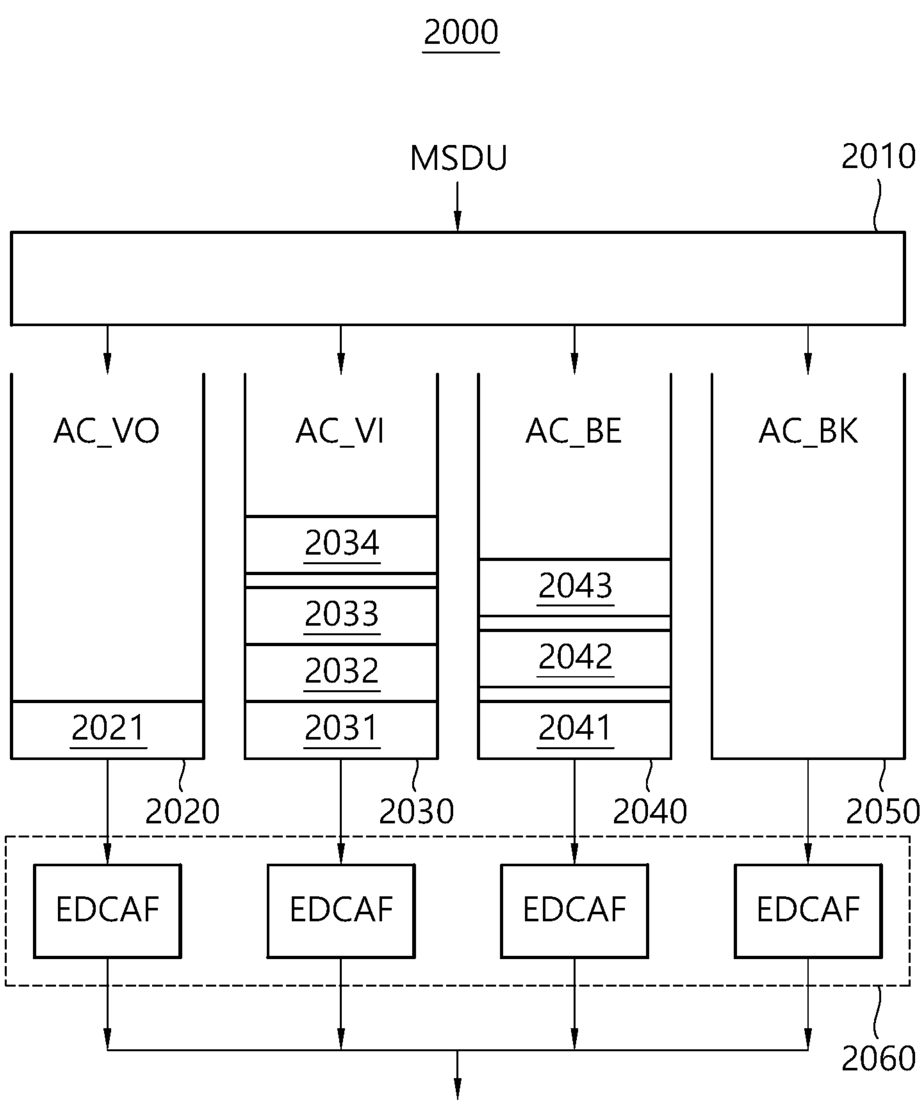
FIG. 20 is a diagram illustrating a channel access method based on EDCA.

FIG. 20 is a diagram illustrating a channel access method based on EDCA. In a wireless LAN system, an STA may perform a channel access according to a plurality of user priorities defined for an enhanced distributed channel access (EDCA).

Particularly, for a transmission of quality of service (QoS) data frame based on a plurality of user priorities, four access categories ((AC) (AC_BK (background), AC_BE (best effort), AC_VI (video), and AC_VO (voice)) may be defined.

The STA may receive traffic data (e.g., MAC service data unit (MSDU)) having a preconfigured user priority from a higher layer.

For example, in order to determine a transmission order of a MAC frame to be transmitted by the STA, a differential value may be set to each traffic data in the user priority. The user priority may be mapped to each access category (AC) to which traffic data is buffered in the scheme as represented in Table 5 below.

TABLE 5

| Priority | User priority | AC (access category) |
|---|---|---|
| low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| high | 7 | AC_VO |

In the present disclosure, the user priority may be understood as a traffic identifier (hereinafter, 'TID') that represents a property of data traffic.

Referring to Table 5, the traffic data of which user priority (i.e., TID) is '1' or '2' may be buffered to a transmission queue 2050 of AC_BK type. The traffic data of which user priority (i.e., TID) is '0' or '3' may be buffered to a transmission queue 2040 of AC_BE type.

The traffic data of which user priority (i.e., TID) is '4' or '5' may be buffered to a transmission queue 2030 of AC_VI type. The traffic data of which user priority (i.e., TID) is '6' or '7' may be buffered to a transmission queue 2020 of AC_VO type.

Instead of DCF interframe space (DIFS), CWmin, and CWmax, which are parameters for the backoff operation/procedure based on the conventional distributed coordination function (DCF), EDCA parameter set, arbitration interframe space (AIFS) [AC], CWmin [AC], CWmax [AC], and TXOP limit [AC] may be used for backoff operation/procedure of an STA that performs EDCA.

Based on the differentiated EDCA parameter set, a difference of transmission priority between ACs may be implemented. A default value of the EDCA parameter set (i.e., AIFS [AC], CWmin [AC], CWmax [AC], and TXOP limit [AC]) that corresponds to each AC is exemplified as represented in Table 6 below.

TABLE 6

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameter set for each AC may be set to a default value or may be included in a beacon frame and transferred to each STA from an access point (AP). The EDCA parameter set has higher priority as values of AIFS [AC] and CWmin [AC] become smaller, and accordingly, a channel access delay is shortened, and more bands may be used in a given traffic environment.

The EDCA parameter set may include information for a channel access parameter (e.g., AIFS [AC], CWmin [AC], and CWmax [AC]) for each AC.

The backoff operation/procedure for EDCA may be performed based on the EDCA parameter set which is individually set to four ACs included in each STA. A proper configuration of an EDCA parameter value that defines different channel access parameters for each AC may optimize a network performance, and simultaneously, increase a transmission effect by a priority of traffic.

Therefore, an AP of a wireless LAN system needs to perform an overall management and adjustment function for the EDCA parameter to guarantee a fair medium access for all STAs that participate in a network.

Referring to FIG. 20, a single STA (or an AP 2000) may include a virtual mapper 2010, a plurality of transmission queues 2020 to 2050, and a virtual collision processor 2060. The virtual mapper 2010 shown in FIG. 20 may perform the role of mapping an MSDU received from a logical link control (LLC) layer to a transmission queue that corresponds to each AC.

The plurality of transmission queues 2020 to 2050 shown in FIG. 20 may perform the role of an individual EDCA contention entity for a wireless media access in a single STA (or an AP).

Figure 21:
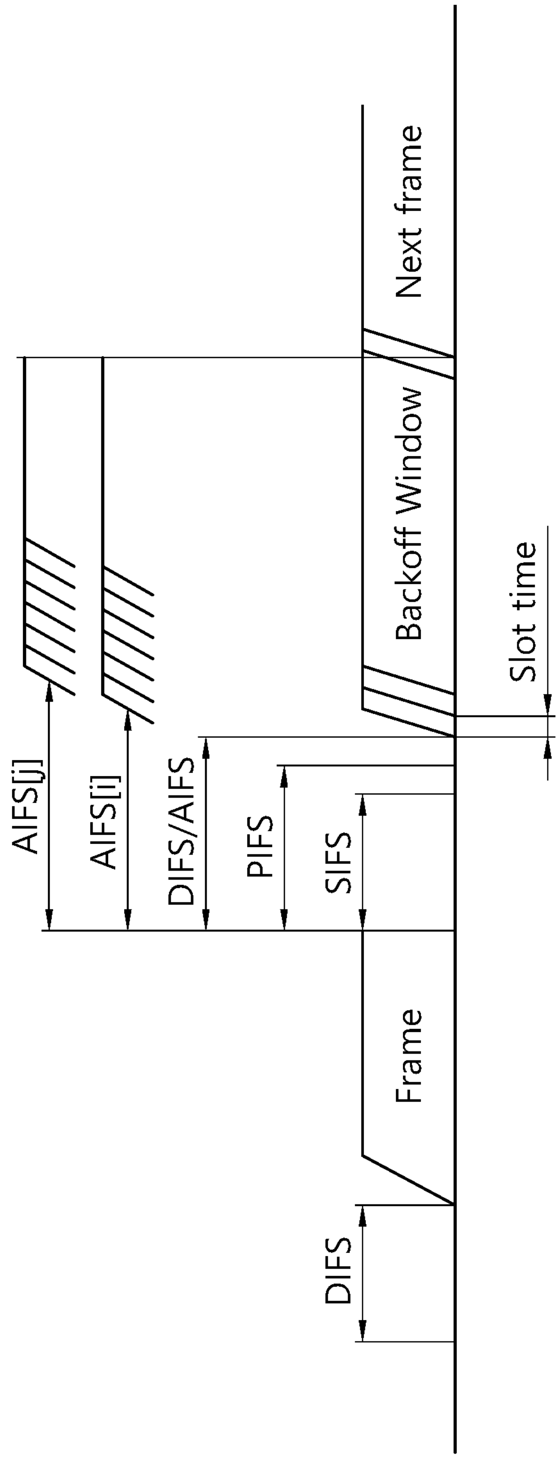
FIG. 21 is a conceptual diagram illustrating a backoff operation/procedure of EDCA.

FIG. 21 is a conceptual diagram illustrating a backoff operation/procedure of EDCA.

A plurality of STAs may share a wireless medium based on DCF which is a contention based function. The DCF may use CSMA/CA for adjusting a collision between STAs.

According to the channel access technique, if a medium is not used during a DCF inter frame space (DIFS) (i.e., channel is idle), an STA may transmit an MPDU which is internally decided. The DIFS is a type of a time length used in IEEE standard, and IEEE standard uses various time durations such as SIFS (Short Inter-frame Space), PIFS (PCF Inter-frame Space), DIFS, and AIFS (arbitration interframe space). The specific value of each time duration may be configurable in various manners but may be configured as a length is elongated in an order of slot time, SIFS, PIFS, DIFS, and AIFS, generally.

In the case that a wireless medium is used by another STA by the carrier sensing mechanism (i.e., the channel is busy), the STA may determine a size of a contention window (hereinafter, "CW") and perform the backoff operation/procedure.

In order to perform the backoff operation/procedure, each STA may set a backoff value which is randomly selected with a contention window (CW) to a backoff counter.

Each STA may perform a backoff procedure for channel access by counting down a backoff window in slot times. Among the plurality of STAs, an STA selecting the relatively shortest backoff window may obtain a transmission opportunity (hereinafter, "TXOP") as the right to occupy a medium.

During the time duration for the TXOP, the remaining STAs may suspend the countdown operation. The remaining STAs may wait until the time period for the TXOP expires. After the time period for the TXOP expires, the remaining STAs may resume the suspended countdown operation to occupy the wireless medium.

According to such a transmission method based on the DCF, a collision phenomenon may be prevented, which may occur when a plurality of STAs simultaneously transmits a frame. However, the channel access technique using the DCF does not have a concept of a transmission priority (i.e., user priority). That is, using the DCF cannot guarantee the quality of service (QoS) of traffic to be transmitted by a STA.

In order to resolve this problem, a hybrid coordination function (hereinafter, "HCF") as a new coordination function is defined in 802. 11e. The newly defined HCF has more enhanced performance than the channel access performance of the legacy DCF. For enhancing QoS, the HCF may employ two different types of channel access methods, which are HCF-controlled channel access (HCCA) of a polling method and contention-based enhanced distributed channel access (EDCA).

Referring to FIG. 21, the STA assumes that the EDCA is performed for the transmission of traffic data buffered in the STA. Referring to Table 5, the user priority set to each traffic data may be differentiated to 8-step.

Each STA may include an output queue of four types (AC_BK, AC_BE, AC_VI, and AC_VO) which are mapped to the user priority of 8-step.

The ISF such as SIFS, PIFS, and DIFS is additionally described as below.

The ISF may be determined based on an attribute which is specified by a physical layer of an STA, regardless of a bit rate of the STA. Among the inter frame spacings (IFSs), the remainder other than the AIFS may use a preset value for each physical layer in a fixed manner.

The AIFS may be set to a value that corresponds to a transmission queue of four types which are mapped to the user priority as represented in Table 5.

The SIFS has the shortest time gap among the IFSs mentioned above. Accordingly, the SIFS may be used when an STA that occupies a wireless medium is required to maintain the occupation of the medium without any interruption by another STA during a period in which a frame exchange sequence is performed.

That is, the smallest gap between transmissions within a frame exchange sequence is used, and a priority may be provided for which a frame exchange sequence in progress is completed. Furthermore, the STA that accesses the wireless medium by using the SIFS may immediately start a transmission from the SIFS boundary without determining whether the medium is busy.

The SIFS duration for a specific physical (PHY) layer may be defined based on a SIFSTime parameter. For example, the SIFS value is 16 μs in physical (PHY) layers according to IEEE 802.11a, IEEE 802.11g, IEEE 802.11n, and IEEE 802.11ac standards.

The PIFS may be used to provide an STA the next highest priority level after the SIFS to the STA. That is, the PIFS may be used to obtain a priority to access the wireless medium.

The DIFS may be used by an STA that transmits a data frame (MPDU) and a management frame (Mac Protocol Data Unit; MPDU) based on the DCF. After a received frame and a backoff time expire, in the case that the medium is determined to be idle by a carrier sense (CS) mechanism, the STA may transmit a frame.

Figure 22:
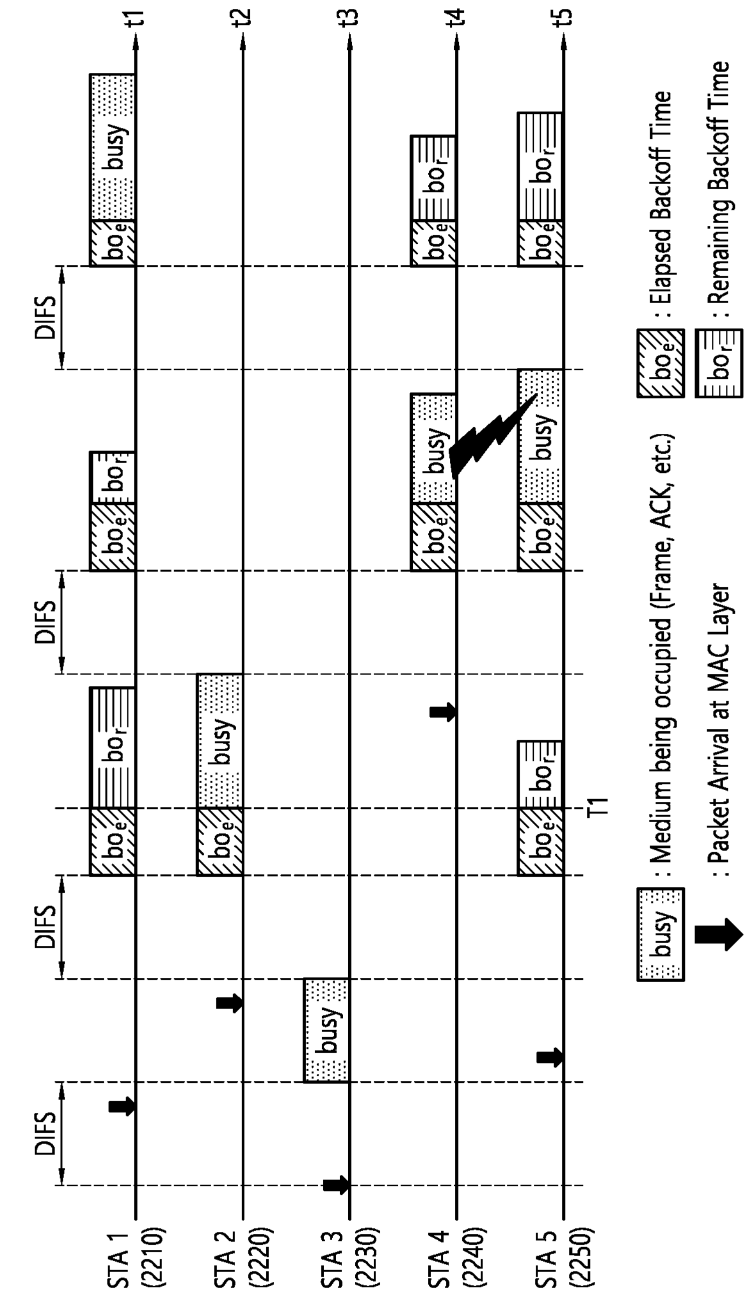
FIG. 22 is a diagram illustrating a backoff operation.

FIG. 22 is a diagram illustrating a backoff operation.

Each of STAs 2210, 2220, 2230, 2240, and 2250 may select a backoff value for the backoff operation/procedure individually. And then, each of the STAs may attempt to perform transmission after waiting for time expressing the selected backoff value in slot time (i.e., the backoff window). Further, each of the STAs may count down the backoff window by slot time. The countdown operation for channel access for a wireless medium may be individually performed by each STA.

A time corresponding to the backoff window may be referred to as a random backoff time (Tb[i]). In other words, each STA may individually set a backoff time (Tb[i]) in a random backoff counter for each STA.

Specifically, the random backoff time (Tb[i]) corresponds to a pseudo-random integer value and may be calculated by Equation 12 below.

$$Tb[i]=\text{Random}(i)*\text{SlotTime} \quad \text{<Equation 12>}$$

Random(i) in Equation 1 denotes a function using uniform distribution and generating a random integer between 0 and CW[i]. CW[i] may be construed as a contention window that is selected between a minimum contention window (CWmin[i]) and a maximum contention window (CWmax[i]). The minimum contention window (CWmin[i]) and the maximum contention window (CWmax[i]) may correspond to CWmin[AC] and CWmax[AC], which are default values in Table 6.

In initial channel access, the STA may select a random integer between 0 and CWmin[i], with CW[i] set to CWmin [i]. In this embodiment, the selected random integer may be referred to as a backoff value.

The parameter "i" may be understood as the user priority level of traffic data. That is, the parameter "i" in Equation 12 may be understood as corresponding to any one of AC_VO, AC_VI, AC_BE, and AC_BK in Table 5.

SlotTime in Equation 12 may be used to provide sufficient time for a preamble of the transmitting STA to be fully detected by a neighboring STA. SlotTime in Equation 12 may be used to define the PIFS and the DIFS mentioned above. For example, SlotTime may be 9 μs.

For example, when the user priority level (i) is 7, an initial backoff time (Tb [AC_VO]) for a transmission queue of the AC_VO type may be a time expressing a backoff value, which is selected between 0 and CWmin[AC_VO], in a slot time.

When a collision occurs between STAs according to the backoff procedure (or when an ACK frame of a transmitted frame is not received), the STA may calculate increased backoff time (Tb[i]') by Equation 13 below.

$$CW\text{new}[i]=((CW\text{old}[i]+1)*PF)-1 \quad \text{<Equation 13>}$$

Referring to Equation 13, a new contention window (CWnew[i]) may be calculated based on a previous contention window (CWold[i]). PF in Equation 13 may be calculated in accordance with a procedure defined in IEEE 802.11e. For example, PF in Equation 13 may be set to 2.

In this embodiment, the increased backoff time (Tb[i]') may be construed as time expressing a random integer (i.e., backoff value), which is selected between 0 and the new contention window (CWnew[i]), in slot time.

CWmin[i], CWmax[i], AIFS[i], and PF values mentioned in FIG. 22 may be signaled from an AP through a QoS parameter set element, which is a management frame. The CWmin[i], CWmax[i], AIFS[i], and PF values may be values preset by the AP and the STA.

Referring to FIG. 22, if a particular medium is changed from an occupied or busy state to an idle state, the plurality of STAs may attempt to transmit data (or a frame). In this case, to minimize a collision between STAs, each STA may select backoff time (Tb[i]) according to Equation 12 and may attempt transmission after waiting for slot time corresponding to the selected backoff time.

When a backoff operation/procedure is initiated, each STA may count down an individually selected backoff counter time by slot times. Each STA may continuously monitor the medium while performing the countdown.

When the wireless medium is determined to be occupied, the STAs may suspend the countdown and may wait. When the wireless medium is determined to be idle, the STAs may resume the countdown.

Referring to FIG. 22, when a frame for the third STA 2230 reaches the MAC layer of the third STA 2230, the third STA 2230 may determine whether the medium is idle during a DIFS. When it is determined that the medium is idle during the DIFS, the third STA 2230 may transmit the frame.

While the frame is transmitted from the third STA 2230, the remaining STAs may check the occupancy state of the medium and may wait for the transmission period of the frame. A frame may reach the MAC layer of each of the first STA 2210, the second STA 2220, and the fifth STA 2250. When it is determined that the medium is idle, each STA may wait for the DIFS and may then count down backoff time individually selected by each STA.

FIG. 22 shows that the second STA 2220 selects the shortest backoff time and the first STA 2210 selects the longest backoff time. FIG. 22 shows that the remaining backoff time for the fifth STA 2250 is shorter than the remaining backoff time for the first STA 2210 at the time (T1) when a backoff operation/procedure for the backoff time selected by the second STA 2220 is completed and the transmission of a frame starts.

When the medium is occupied by the second STA 2220, the first STA 2210 and the fifth STA 2250 may suspend the backoff operation/procedure and may wait. When the second STA 2220 finishes occupying the medium (i.e., when the medium returns to be idle), the first STA 2210 and the fifth STA 2250 may wait for the DIFS.

Subsequently, the first STA 2210 and the fifth STA 2250 may resume the backoff procedure based on the suspended remaining backoff time. In this case, since the remaining backoff time for the fifth STA 2250 is shorter than the remaining backoff time for the first STA 2210, the fifth STA 2250 may complete the backoff procedure before the first STA 2210.

Meanwhile, referring to FIG. 22, when the medium is occupied by the second STA 2220, a frame for the fourth STA 2240 may reach the MAC layer of the fourth STA 2240. When the medium is idle, the fourth STA 2240 may wait for the DIFS. Subsequently, the fourth STA 2240 may count down the backoff time selected by the fourth STA 2240.

Referring to FIG. 22, the remaining backoff time for the fifth STA 2250 may coincidently match the remaining backoff time for the fourth STA 2240. In this case, a collision may occur between the fourth STA 2240 and the fifth STA 2250. If the collision occurs between the STAs, both the fourth STA 2240 and the fifth STA 2250 may not receive an ACK and may fail to transmit data.

Accordingly, the fourth STA 2240 and the fifth STA 2250 may individually calculate a new contention window (CWnew[i]) according to Equation 13. Subsequently, the fourth STA 2240 and the fifth STA 2250 may individually count down backoff time newly calculated according to Equation 13.

Meanwhile, when then medium is occupied state due to transmission by the fourth STA 2240 and the fifth STA 2250, the first STA 2210 may wait. Subsequently, when the medium is idle, the first STA 2210 may wait for the DIFS and may then resume backoff counting. After the remaining backoff time for the first STA 2210 elapses, the first STA 2210 may transmit a frame.

Figure 23:
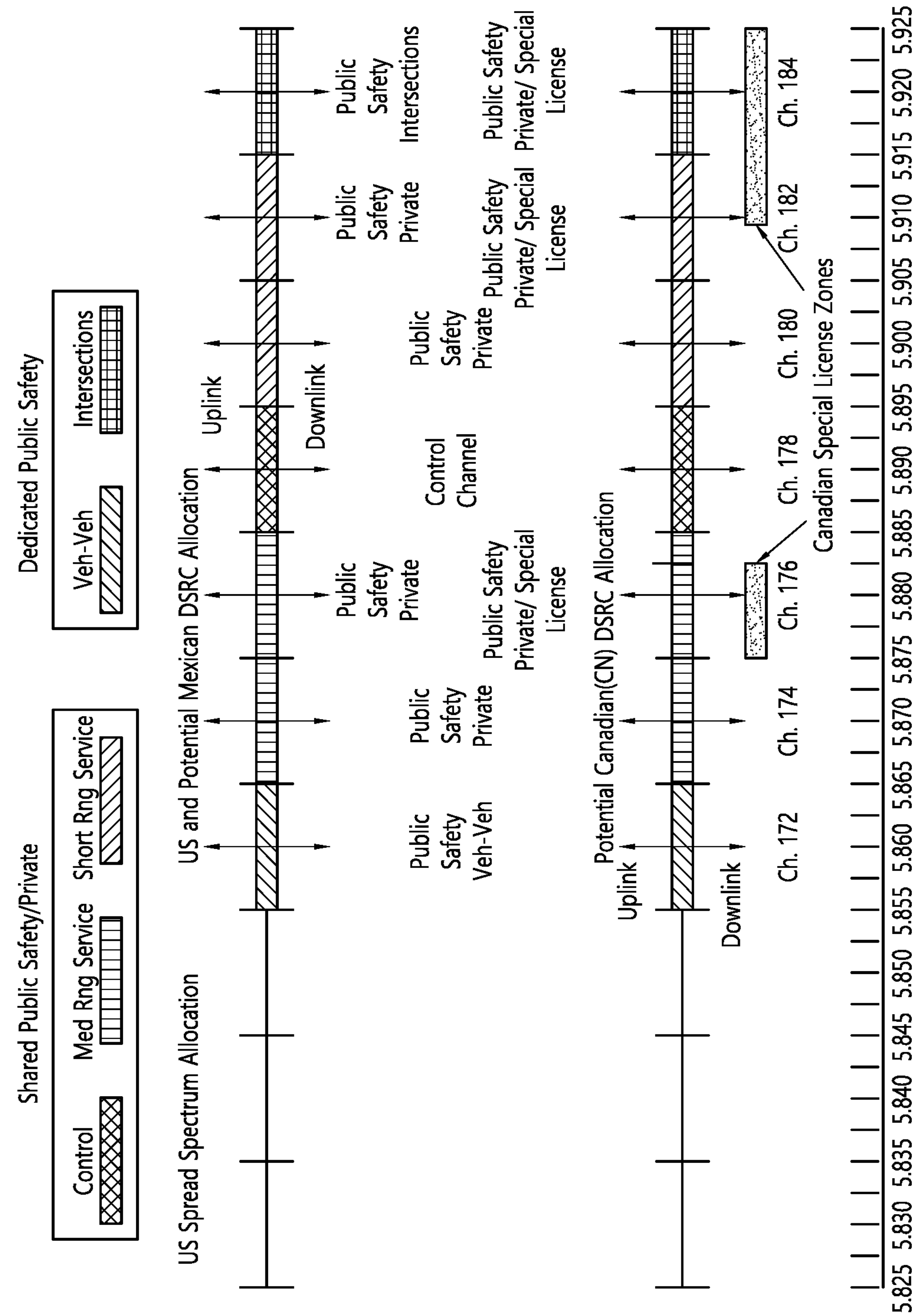
FIG. 23 illustrates a band plan of 5.9 GHz DSRC.

FIG. 23 illustrates a band plan of 5.9 GHz DSRC.

5.9 GHz DSRC is a communication service in a range from a short distance to a middle distance which supports the communication environment for all the vehicle on the roadside and between vehicles, the public safety, and the unpublished task. The DSRC provides very high data transmission speed in a situation in which a waiting time of a communication link is minimized, and division of a small communication range is important, and accordingly, supplements the cellular communication. In addition, PHY and MAC protocols are based on IEEE 802.11p revision for a radio access in a vehicle environment (WAVE).

IEEE 802.11

802.11p standard uses the PHY of 802.11a standard by 2× down clocking. That is, a signal is transmitted by using 10 MHz bandwidth, not 20 MHz bandwidth. The numerology in which 802.11a and 802.11p are compared is as below.

TABLE 7

| | IEEE 802.11a | IEEE 802.11p |
|---|---|---|
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |

TABLE 7-continued

| | IEEE 802.11a | IEEE 802.11p |
|---|---|---|
| Default BW | 20 MHz | 10 MHz |
| Data rate (Mbps) | 6, 9, 12, 18, 24, 36, 48, 54 Mbps | 3, 4.5, 6, 9, 12, 18, 24, 27 Mbps |
| Frequency band | 5 GHz ISM | 5.9 GHz dedicated |

The DSRC band includes a control channel and a service channel, and data transmissions of 3, 4.5, 6, 9, 12, 18, 24, and 27 Mbps are available through each of the channels. In the case that the DSRC band includes an optional channel of 20 MHz, transmissions of 6, 9, 12, 18, 24, 36, 48, and 54 Mbps are available. Transmissions of 6, 9, 12 Mbps need to be supported for all services and channels. In the case of the control channel, a preamble has 3 Mbps, but a message itself has 6 Mbps. Channels 174 and 176 and channels 180 and 182 become channels 175 and 181 of 20 MHz, respectively, in the case that the channels are approved by a frequency regulation organization. The remainder is left for future use. Through the control channel, a short message, an alarm data, and a public safety warning data are broadcasted to all OBUs (On Board Units). The reason for separation of the control from the service channel is for efficiency, and to maximize a service quality and to reduce interference between service.

Channel 178 is the control channel, and all OBUs automatically search the control channel and receive an alarm, a data transmission, and a warning message from an RSU (Road Side Unit). All data of the control channel need to be transmitted within 200 ms and are repeated in a predefined period. In the control channel, the public safety data is prior to all private messages. The private message greater than 200 ms is transmitted through the service channel.

Through the service channel, a private message or a long public safety message is transmitted. To prevent a collision, the technique of detecting a channel state before a transmission (Carrier Sense Multiple Access: CSMA) is used.

Next, an EDCA parameter in OCB (Outside Context of BSS) mode is defined. The OCB mode means a state in which an inter-node direct communication is available without a process of being associated with an AP. The following table represents a set of basic EDCA parameters for an STA operation in the case that dot11OCBActivated is true.

TABLE 8

| AC | CWmin | CWmax | AIFSN | TXOP limit |
|---|---|---|---|---|
| AC_BK | aCWmin | aCWmax | 9 | 0 |
| AC_BE | aCWmin | aCWmax | 6 | 0 |
| AC_VI | (aCWmin + 1)/2 − 1 | aCWmin | 3 | 0 |
| AC_VO | (aCWmin + 1)/4 − 1 | (aCWmin + 1)/2 − 1 | 2 | 0 |

Characteristics of the OCB mode is as follows.

1. In a MAC header, To/From DS fields may be set to ‘0’.
2. Fields related to Address
   - Individual or group destination MAC address may be used.
   - A BSSID field may be the same as a wildcard BSSID. (BSSID field=wildcard BSSID)
   - In a Data/Management frame, Address 1 may be an RA, Address 2 may be a TA, and Address 3 may be a wildcard BSSID.
3. An authentication process, an association process, or data confidentiality services of the IEEE 802.11 standard may not be used (or utilized).
4. A TXOP limit may be set to ‘0’.
5. Only a TC (TID) may be used.
6. STAs may not be required to synchronize to a common clock or use such mechanisms.
   - STAs may maintain a timing synchronization function (TSF) timer for purposes other than synchronization
7. The STA may send Action frames, and, if the STA maintains a TSF Timer, the STA may transmit Timing Advertisement frames.
8. The STA may send control frames excluding subtype PS-Poll, CF-End, and CF-End +CFAck.
9. The STA may send data frames of subtype Data, Null, QoS Data, and QoS Null.
10. An STA having dot11OCBActivated that is equal to true should not join (or participate in) or start a BSS.

Format of 11p PPDU

Figure 24:
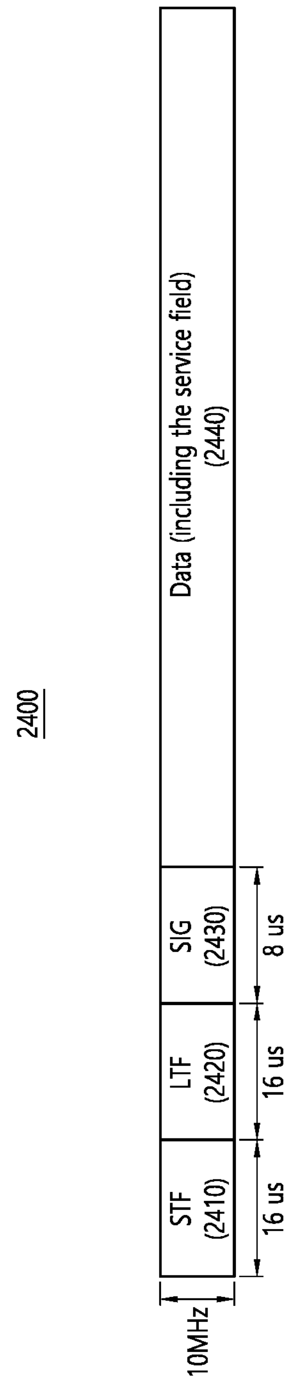
FIG. 24 shows a format of an 11p PPDU.

FIG. 24 shows a format of an 11p PPDU.

Referring to FIG. 24, a frame of the 802.11p standard (hereinafter referred to as 11p PPDU 2400) may support vehicle-to-vehicle (V2V) communication in a 5.9 GHz band. The 11p PPDU 2400 may include an STF 2410 for synchronization (sync) and Automatic Gain Control AGC, an LTF 2420 for channel estimation, and/or a SIG (or SIG field) 2430 including information related to a Data field 2440. The Data field 2440 may be configured to include 16 bits configuring the service field.

The 11p PPDU 2400 may be configured by applying the same OFDM numerology as the IEEE 802.11a standard for a 10 MHz bandwidth. For example, the IEEE 802.11p standard may be applied by 2× down-clocking the OFDM numerology for a 20 MHz bandwidth according to the IEEE 802.11a standard. Therefore, a symbol of the 11p PPDU 2400 may be configured to be longer than a symbol of a frame (or PPDU) of the IEEE 802.11a standard. A symbol of the 11p PPDU 2400 may have a symbol duration of 8 μs. The 11p PPDU 2400 may have a length that is two times longer than a frame according to the 802.11a standard in the aspect of time.

Format of NGV PPDU

Hereinafter, a technical characteristic that can provide interoperability of multiple system will be proposed. For example, multiple systems may include a system (IEEE 802.11bd standard) that is proposed for supporting throughput enhancement, coverage extension, and/or high speed for Vehicle-to-Everything (V2X) in a 5.9 GHz band, and/or a DSRC system that is based on the existing (or conventional) IEEE 802.11p standard.

Figure 25:
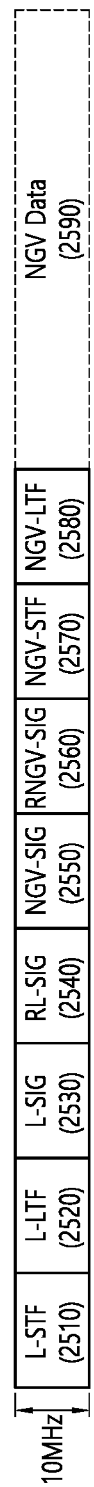
FIG. 25 shows a format of an NGV PPDU for performing 10 MHz transmission.
Figure 26:
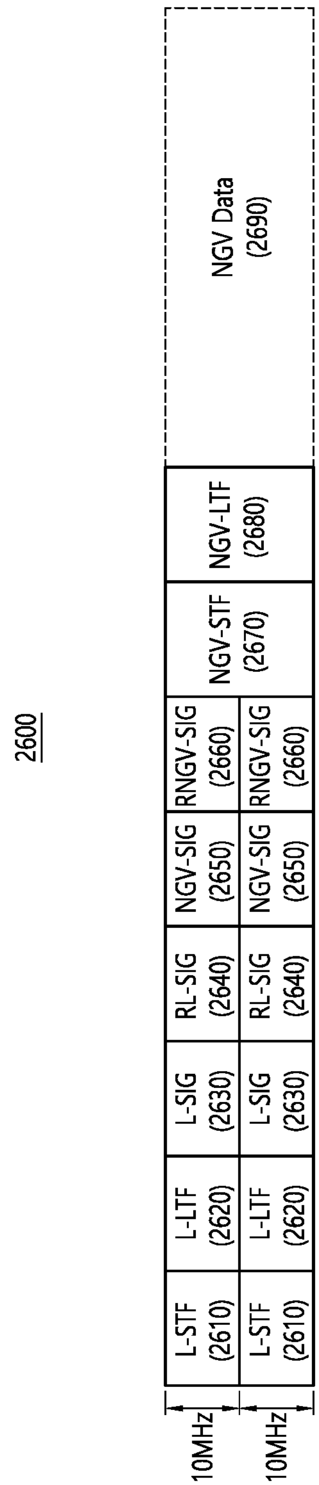
FIG. 26 shows a format of an NGV PPDU for performing 20 MHz transmission.

In order to achieve smooth V2X support in a 5.9 GHz band, a technology for NGV considering throughput enhancement and high-speed support in the DSRC is being developed. FIG. 25 to FIG. 26 show the format of a frame (hereinafter referred to as NGV PPDU) according to the IEEE 802.11bd standard.

An NGV PPDU that will hereinafter be described may include a preamble, a data field that is contiguous to the preamble, and a midamble that is contiguous to the data field. Additionally, the NGV PPDU may include an additional data field that is contiguous to the midamble. A number of symbols or a periodicity (or period or cycle period) of a midamble within an NGV PPDU may be variously configured. For example, the preamble of the NGV PPDU may include an L-STF, an L-LTF, an L-SIG, an RL-SIG, an NGV-SIG, an RNGV-SIG, an NGV-STF, and/or an NGV-LTF. An NGV midamble may be configured to have the same format as the NGV-LTF. The above-mentioned L-SIG, RL-SIG, NGV-SIG, and/or RNGV-SIG may also be referred to as an L-SIG field, an RL-SIG field, an NGV-SIG field, and/or an RNGV-SIG field, respectively.

According to an embodiment, the NGV part (e.g., NGV-STF, NGV-LTF, and NGV-data) may consist of symbols having the same symbol length as the 11p PPDU. For example, one symbol length (or duration) of the NGV part may be set to 8 μs. That is, the subcarrier spacing of the NGV part may be set to 156.25 kHz.

FIG. 25 shows a format of an NGV PPDU for performing 10 MHz transmission.

Referring to FIG. 25, for backward compatibility or interoperability with the IEEE 802.11p, an NGV PPDU 2500 may include fields (i.e., L-STF, L-LTF and/or L-SIG) of a frame according to the IEEE 802.11p standard (hereinafter referred to as an 11p PPDU). For example, the NGV PPDU 2500 may include an L-STF 2510, an L-LTF 2520 or an L-SIG 2530. Additionally, the NGV PPDU may include an RL-SIG 2540, an NGV-SIG 2550, an RNGV-SIG 2560, an NGV-STF 2570, an NGV-LTF 2580, and/or an NGV Data 2590.

The RL-SIG 2540 may be contiguous to the L-SIG 2530. The RL-SIG 2540 may be a field in which the L-SIG 2530 is repeated. In other words, the RL-SIG 2540 may include the same information field as the L-SIG 2530 and may be modulated by using the same method as the L-SIG 2530 (e.g., BPSK).

The NGV-SIG 2550 may be related to transmission information. For example, the NGV-SIG 2550 may include the transmission information. For example, the NGV-SIG 2550 may be configured to be equal to 24 bits. For example, the NGV-SIG 2550 may include information related to a Physical layer (PHY) Version, information related to a bandwidth, information related to an MCS, information related to a number of spatial streams, information related to a midamble periodicity, information related to an LTF format, information related to an LDPC Extra OFDM Symbol, information related to a CRC, and/or information related to a tail bit. BCC encoding based on a ½ coding rate may be applied to the NGV-SIG 2550.

The RNGV-SIG 2560 may be contiguous to the NGV-SIG 2550. The RNGV-SIG 2560 may be a field in which the NGV-SIG 2550 is repeated. In other words, the RNGV-SIG 2560 may include the same information field as the NGV-SIG 2550 and may be modulated by using the same method as the NGV-SIG 2550 (e.g., BPSK).

The NGV-STF 2570 may be configured by 2× down-clocking a 20 MHz VHT-STF that is configured according to the IEEE 802.11ac standard. The NGV-LTF 2580 may be configured by 2× down-clocking a 20 MHz VHT-LTF that is configured according to the IEEE 802.11ac standard.

The NGV-LTF 2580 may be configured based on at least one LTF format. For example, the NGV-LTF 2580 may be configured based on at least one of an NGV-LTF-1x format, an NGV-LTF-2x format, or a repeated NGV-LTF-2x format. Information related to the LTF format that is used in the NGV-LTF 2580 may be included in the NGV-SIG 2550.

For example, the NGV-LTF-2x format may be set as the default format. As another example, the NGV-LTF-1x format may be used for high-efficiency transmission of one spatial stream. As yet another example, the repeated NGV-LTF-2x format may be used for extended range transmissions. The repeated NGV-LTF-2x format may be configured by repeating the NGV-LTF-2x format from which 1.6 us of one pre-appended cyclic prefix (CP) and guard interval (GI) are excluded. The repeated NGV-LTF-2x format may be used when dual carrier modulation (DCM) and BPSK modulation are applied to the NGV data 2590. For example, when the DCM and BPSK modulation are applied to the NGV data 2590, regardless of the information related to the LTF format included in the NGV-SIG 2550, the repeated NGV-LTF-2x format may be used in/applied to the NGV-LTF 2580.

For example, in the 10 MHz transmission, a sequence of the NGV-LTF-1x format may be configured as shown below in Equation 14.

$$NGV\text{-}LTF\text{-}1\times\text{sequence}=[1,0,1,0,-1,0,1,0,-1,0,-1,0,1,0,1,0,1,0,-1,0,1,0,1,0,1,0,1,0,0,0,-1,0,1,0,-1,0,-1,0,-1,0,-1,0,-1,0,-1,0,1,0,-1,0,-1,0,-1,0,1,0,1,0,-1]$$ <Equation 14>

For example, in the 10 MHz transmission, a sequence of the NGV-LTF-2x format may be configured as shown below in Equation 15.

$$NGV\text{-}LTF\text{-}2\times \text{ sequence } [1, 1, LTF\_\text{left}, 0, LTF\_\text{right}, -1, -1]$$ <Equation 15>

Referring to Equation 15, LTF_left and LTF_right may be configured as shown below in Equation 16.

$$LTF\_\text{left}=[1,1,-1,-1,1,1,-1,1,-1,1,1,1,1,1,1,-1,-1,1,1,-1,1,-1,1,1,1,1]$$

$$LTF\_\text{right}=[1,-1,-1,1,1,-1,1,-1,-1,-1,-1,-1,-1,1,1,-1,-1,1,-1,1,-1,1,1,1,1]$$ <Equation 16 >

The NGV data 2590 may include a service field, PHY pad bits, and/or a PSDU.

Although it is not shown in the drawing, the NGV PPDU 2500 may include a midamble that is contiguous to the NGV data 2590. Additionally, the NGV PPDU 2500 may include an additional data field that is contiguous to the midamble.

The midamble may be used for performing additional channel estimation. That is, the midamble has an effect of reducing the effect of Doppler shift.

The midamble may be inserted/configured in the NGV PPDU 2500 according to a designated periodicity. Information related to the designated periodicity may be included in the NGV-SIG 2550. For example, the NGV-SIG 2550 may include information related to the midamble periodicity. The midamble periodicity may be set to one of 4, 8 or 16. For example, when the midamble periodicity is set to 4, the NGV PPDU 2500 may include midamble(s) being inserted every 4 data symbols.

The midamble may be configured to have the same format (or type) as the NGV-LTF 2580. For example, the midamble may be configured of at least one of an NGV-LTF-1x format, an NGV-LTF-2x format, or a repeated NGV-LTF-2x format. Information related to the LTF format that is used in the midamble may be included in the NGV-SIG 2550.

FIG. 26 shows a format of an NGV PPDU for performing 20 MHz transmission.

Referring to FIG. 26, an NGV PPDU 2600 may be configured of 20 MHz. The NGV PPDU 2600 may include an L-STF 2610, an L-LTF 2620, an L-SIG 2630, an RL-SIG 2640, an NGV-SIG 2650, an RNGV-SIG 2660, an NGV-STF 2670, an NGV-LTF 2680, and/or an NGV Data 2690.

The L-STF 2610, L-LTF 2620 or L-SIG 2630 may be configured by being duplicated in 10 MHz units. The L-STF 2610, L-LTF 2620 or L-SIG 2630 may be related to the L-STF 2410, L-LTF 2420 or L-SIG 2430 of FIG. 25.

According to an embodiment, the RL-SIG 2640, NGV-SIG 2650 or RNGV-SIG 2660 may also be configured by being duplicated in 10 MHz units. The RL-SIG 2640, NGV-SIG 2650 or RNGV-SIG 2660 may be related to the RL-SIG 2540, NGV-SIG 2550 or RNGV-SIG 2560 of FIG. 25, respectively.

The NGV-STF 2670 may be configured by 2× down-clocking a 40 MHz VHT-STF that is configured according to the IEEE 802.11ac standard. The NGV-LTF 2680 may be configured by 2× down-clocking a 40 MHz VHT-LTF that is configured according to the IEEE 802.11ac standard.

The NGV-LTF 2680 may be configured based on at least one LTF format. For example, the NGV-LTF 2680 may be configured based on at least one of an NGV-LTF-1x format, an NGV-LTF-2x format, or a repeated NGV-LTF-2x format.

For example, in the 20 MHz transmission, a sequence of the NGV-LTF-1x format may be configured as shown below in Equation 17.

$$NGV\text{-}LTF\text{-}1x\ \text{sequence}=[1,0,-1,0,1,0,-1,0,-1,0,1,0,1,0,1,0,-1,0,1,0,1,0,1,0,1,0,1,0,-1,0,1,0,-1,0,-1,0,-1,0,-1,0,-1,0,1,0,-1,0,-1,0,-1,0,1,0,1,0,-1,0,1,0,0,0,-1,0,1,0,1,0,-1,0,1,0,-1,0,-1,0,1,0,1,0,1,0,-1,0,1,0,1,0,1,0,1,0,1,0,-1,0,1,0,-1,0,-1,0,-1,0,-1,0,-1,0,1,0,-1,0,-1,0,-1,0,1,0,1] \quad \text{<Equation 17>}$$

For example, in the 20 MHz transmission, a sequence of the NGV-LTF-2x format may be configured as shown below in Equation 18.

$$NGV\text{-}LTF\text{-}2\times\text{sequence}=[LTF\_\text{left},1,LTF\_\text{right},-1,-1,-1,1,0,0,0,-1,1,1,-1,LTF\_\text{left},1,LTF\_\text{right}] \quad \text{[Equation 18]}$$

Referring to Equation 18, LTF_left and LTF_right may be configured as presented above in Equation 16.

The NGV data 2690 may include a service field, PHY pad bits, and/or a PSDU. The NGV data 2690 may be related to the NGV data 2590 of FIG. 25.

Although it is not shown in the drawing, similarly to the NGV PPDU 2500 of FIG. 25, the NGV PPDU 2600 may include a midamble that is contiguous to the NGV data 2690. Additionally, the NGV PPDU 2600 may include an additional data field that is contiguous to the midamble.

An example of this specification is related to an NGV PPDU (or 11bd PPDU). The NGV PPDU may be used in various wireless communication systems, and, for example, the NGV PPDU may be used in an IEEE 802.11bd wireless LAN communication system.

The NGV PPDU may be referred to by using various terms. For example, the NGV PPDU may also be referred to as an NGV frame, an 11bd frame, an 11bd PPDU, an NGV signal and so on. Additionally, as another example, the NGV PPDU may also be referred to by using other various terms, such as a first type PPDU, a transmission PPDU, a reception PPDU, a WLAN PPDU, and so on. Hereinafter, for simplicity in the description, a frame of the IEEE 802.11bd standard may also be referred to as an NGV PPDU. Additionally, a PPDU according to the IEEE 802.11p standard may also be referred to as an 11p PPDU.

Similarly, an STA supporting the IEEE 802.11bd standard may also be referred to by using other various terms. For example, an STA supporting the IEEE 802.11bd standard may also be referred to as an 11bd STA, an NGV STA, a transmitting STA or a receiving STA. Hereinafter, for simplicity in the description, the STA supporting the IEEE 802.11bd standard may be referred to as an NGV STA. Specifically, the NGV STA that has received the frame may be referred to as a receiving STA, and the STA that has transmitted the frame may be referred to as a transmitting STA. Additionally, an STA supporting the IEEE 802.11p standard may be referred to as an 11p STA. Furthermore, the 5.9 GHz band may also be variously referred to as an NGV band, a reception band, a transmission band, and so on.

In the following specification, technical features related to multiple frame transmission in an NGV STA may be proposed.

For the 802.11p standard, the TXOP limit is set to 0. Accordingly, only one frame exchange may occur. However, in the next-generation V2X communication (NGV standard), the TXOP limit may be set to 0 or more. Accordingly, transmission (or exchange) of a plurality of frames may be permitted within one TXOP. Since transmission of a plurality of frames is allowed within one TXOP, there is an effect of improving performance. An operation in which a plurality of frames are transmitted within one TXOP may be referred to as multi-frame transmission.

Hereinafter, a problem that occurs when multiple frame transmission is supported and technical features for solving the problem may be described.

Figure 27:
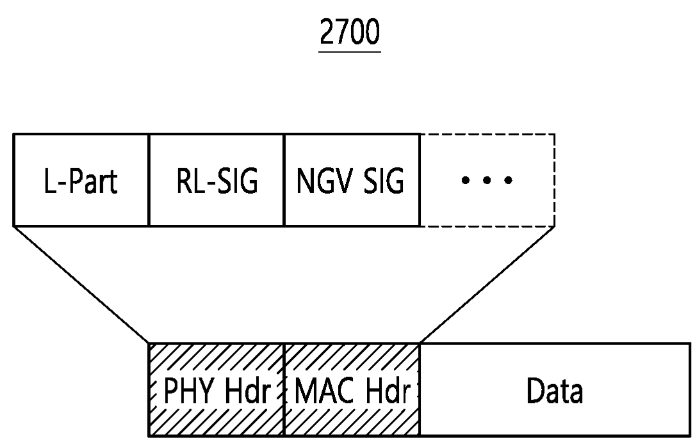
FIG. 27 shows an example of an NGV PPDU transmitted through multiple frame transmission.

FIG. 27 shows an example of an NGV PPDU transmitted through multiple frame transmission.

Referring to FIG. 27, the NGV PPDU 2700 may be related to the NGV PPDU 2500 and/or the NGV PPDU 2600 illustrated in FIGS. 25 and 26.

According to an embodiment, the NGV PPDU 2700 may include a PHY Header (PHY Hdr), a MAC Header (MAC Hdr), and Data. The PHY Hdr and MAC Hdr may include an L-Part, an RL-SIG, and an NGV-SIG. The L-Part may mean a Non-HT Short Training Field (L-STF), a Non-HT Long Training Field (L-LTF), and a non-HT SIGNAL field (L-SIG). According to an embodiment, The Data may be an A-MPDU.

The NGV PPDU 2700 may be transmitted through the multiple frame transmission described below. In the following specification, an example in which the NGV PPDU 2700 is transmitted for the multi-frame transmission is described for convenience of description, but is not limited thereto. According to an embodiment, the 11p PPDU 2400 shown in FIG. 24 may be transmitted for the multi-frame transmission.

The NGV STA may support multi-frame transmission in OCB unicast (or OCB unicast mode) and OCB broadcast (or OCB broadcast mode). Multi-frame transmission in OCB broadcast may be described with reference to FIG. 28. Multi-frame transmission in OCB unicast can be described with reference to FIG. 29.

Figure 28:
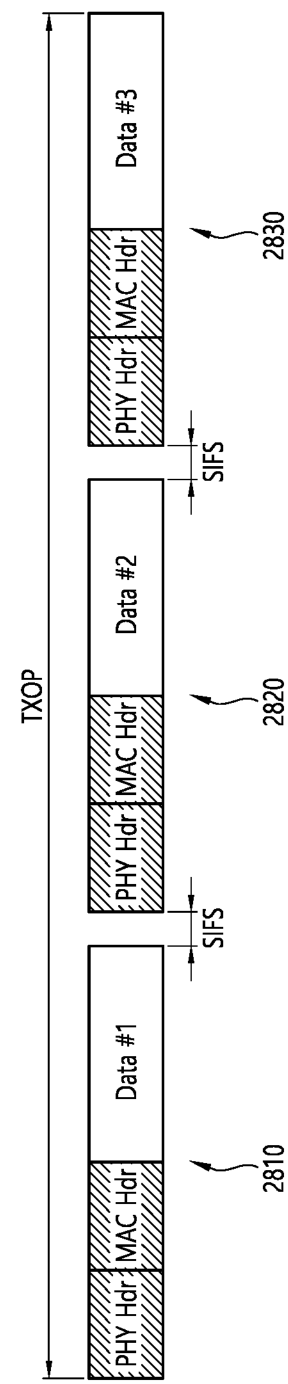
FIG. 28 shows an example of multi-frame transmission in OCB broadcast.

FIG. 28 shows an example of multi-frame transmission in OCB broadcast.

Referring to FIG. 28, the NGV STA may transmit at least one frame (e.g., NGV PPDU) at a specified interval without acknowledgment (or ACK frame) in the OCB broadcast. For example, the specified interval may include a SIFS. FIG. 28 illustrates an example in which the designated interval is set to the SIFS, but is not limited thereto. The specified interval may be variously set. For example, the designated interval may include the SIFS, one slot, a PIFS, an AIFS, or a DIFS.

For example, the NGV STA may acquire a TXOP. The NGV STA may transmit three NGV PPDUs in the OCB broadcast. That is, the NGV STA may transmit the NGV PPDU 2810, the NGV PPDU 2820, and the NGV PPDU 2830 within one TXOP. The interval between the NGV PPDU 2810 and the NGV PPDU 2820 may be set to the SIFS. The interval between the NGV PPDU 2820 and the NGV PPDU 2830 may be set to the SIFS.

Figure 29:
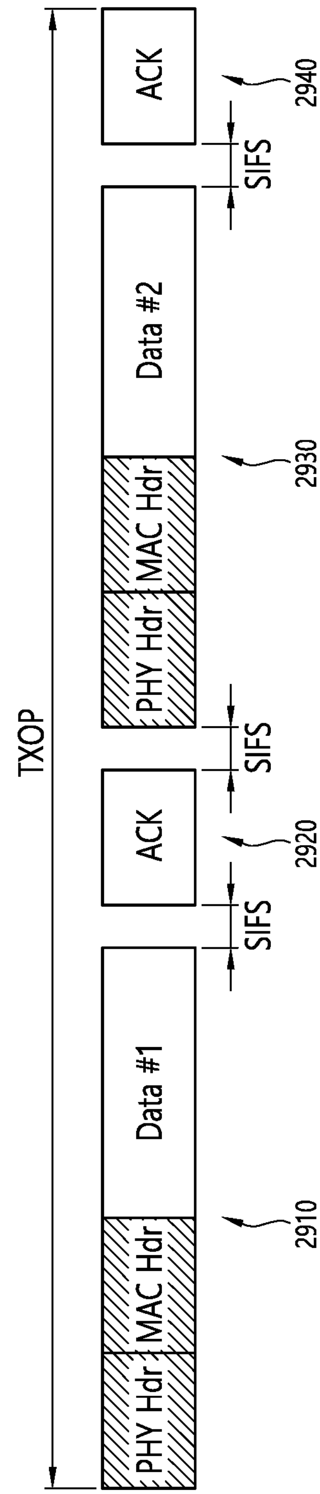
FIG. 29 shows an example of multi-frame transmission in OCB unicast.

FIG. 29 shows an example of multi-frame transmission in OCB unicast.

Referring to FIG. 29, the NGV STA may transmit at least one frame (e.g., NGV PPDU) including an Acknowledge (or ACK frame) in OCB unicast at a specified interval. For example, the specified interval may include the SIFS. FIG. 25 illustrates an example in which the designated interval is set to the SIFS, but is not limited thereto. The specified interval may be variously set. For example, the designated interval may include the SIFS, one slot, a PIFS, an AIFS, or a DIFS.

According to an embodiment, when the Data is an A-MPDU, the ACK may be a block ACK.

For example, the NGV STA may acquire a TXOP. The NGV STA may transmit two NGV PPDUs in OCB unicast. That is, the NGV STA may transmit the NGV PPDU 2910 within one TXOP. After a SIFS, the NGV STA may receive an ACK 2920 for the NGV PPDU 2910. After the SIFS, the NGV STA may transmit an NGV PPDU 2930. After the SIFS, the NGV STA may receive an ACK 2940 for the NGV PPDU 2930.

Referring to FIGS. 28 and 29, the NGV STA may continuously transmit frames (e.g., NGV PPDU) in OCB broadcast. Therefore, collision may occur in OCB broadcast. Hereinafter, an example in which collision occurs in OCB broadcast may be described.

Collision Problem in OCB Broadcast

Figure 30:
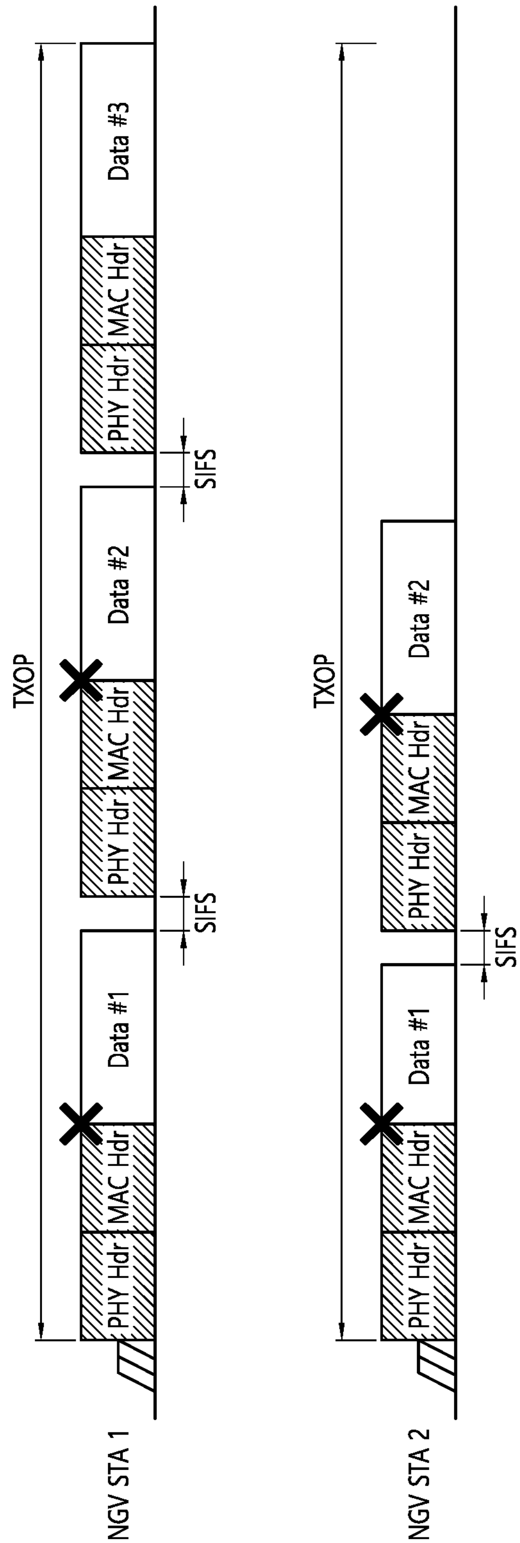
FIG. 30 shows an example in which collision occurs in OCB broadcast.

FIG. 30 shows an example in which collision occurs in OCB broadcast.

Referring to FIG. 30, NGV STA-1 and NGV STA-2 may simultaneously transmit a frame (or NGV PPDU). For example, the NGV STA-1 may perform the multi-frame transmission in the first TXOP. The NGV STA-2 may also perform the multi-frame transmission within the second TXOP. For example, the first TXOP and the second TXOP may be set identically. For another example, the first TXOP and the second TXOP may be configured separately/independently. Accordingly, frames transmitted from NGV STA-1 and NGV STA-2 may collide with each other.

That is, when a plurality of NGV STAs transmit a frame at the same time, or when different frames are transmitted in the middle of a TXOP obtained by a plurality of NGV STAs, the NGV STAs receiving the frames cannot correctly receive the frame. In addition, since the transmitter (i.e., the transmitting STA) does not transmit the ACK, the receiver (i.e., the receiving STA) cannot recognize it. Accordingly, resource wastage may occur due to the above-described collision between frames. Therefore, hereinafter, a technical feature capable of preventing collision between frames transmitted between NGV STAs in OCB broadcast may be proposed.

Example for Resolving Collision in OCB Broadcast

In order to resolve collisions in OCB broadcast, operations of a transmitting STA and a receiving STA may be proposed. The transmitting STA and the receiving STA may support the NGV standard.

1) Operation of the Transmitting STA

According to an embodiment, the transmitting STA may check a channel state using Energy detection (ED) or Guard Interval detection (GID) during the frame interval. In other words, the transmitting STA may check the channel state based on the Energy detection (ED) or the Guard Interval detection (GID) during the frame interval. When the channel state is BUSY (or BUSY state), the transmitting STA may not transmit any more frames even while transmitting multiple frames.

2) Operation of the Receiving STA

The receiving STA may defer channel access during the TXOP configured by the transmitting STA for the multi-frame transmission based on the rule of the conventional standard. However, if a frame including the frame transmitted by the transmitting STA is not received after a frame interval (e.g., SIFS) within the TXOP of the transmitting STA, the receiving STA no longer needs to defer the channel access for the remaining TXOP. Accordingly, thereafter, the receiving STA may ignore the TXOP and perform the channel access again.

In other words, the receiving STA may check the TXOP configured by the transmitting STA for the multi-frame transmission. The receiving STA may defer the channel access during the TXOP. The receiving STA may check the frame transmitted from the transmitting STA within the TXOP. After receiving the frame, the receiving STA may confirm that no more frames are received from the transmitting STA after the frame interval. For example, the receiving STA may confirm that no more frames are received from the transmitting STA after the frame interval based on the MAC address of the transmitting STA. Since the receiving STA does not receive any more frames from the transmitting STA, it may no longer need to defer the channel access for the remaining TXOP. Accordingly, the receiving STA may ignore the TXOP and perform the channel access again.

According to an embodiment, the above-described waiting time for reception of the next frame may be a frame interval or longer. For example, the waiting time for reception of the next frame may be set to an SIFS or SIFS+$\alpha$ (alpha) (e.g., 0.5 slot or 1 slot). However, the present disclosure is not limited thereto.

Figure 31:
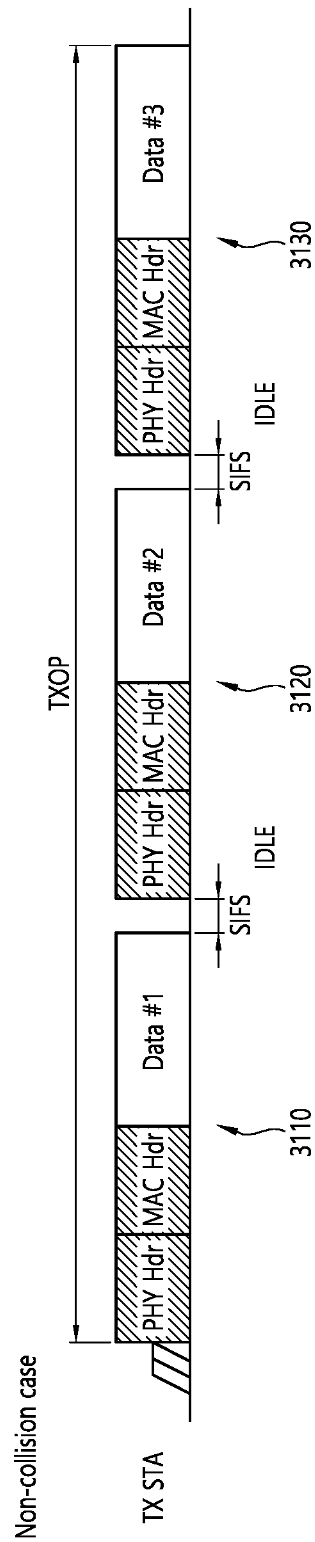
FIG. 31 shows an example in which collision does not occur in OCB broadcast.

FIG. 31 shows an example in which collision does not occur in OCB broadcast.

Referring to FIG. 31, a transmitting STA may acquire a TXOP. The transmitting STA may perform the multi-frame transmission during the acquired TXOP. After transmitting the NGV PPDU 3110, the transmitting STA may check the channel state by using the Energy detection (ED) or the Guard Interval detection (GID) during a frame interval (e.g., SIFS). The transmitting STA may transmit the NGV PPDU 3120 based on an IDLE (state) of the channel. Even after transmitting the NGV PPDU 3120, the channel state can be checked during the frame interval (e.g., SIFS). The transmitting STA may transmit the NGV PPDU 3130 based on the IDLE (state) of the channel. Since the transmitting STA normally transmits the NGV PPDUs 3110, 3120, and 3130, the receiving STA may normally receive the NGV PPDUs 3110, 3120, and 3130. However, according to an embodiment, when the receiving STA receives a frame from another STA that is hidden from the transmitting STA, the receiving STA may not normally receive the NGV PPDUs 3110, 3120, 3130 transmitted by the transmitting STA.

Figure 32:
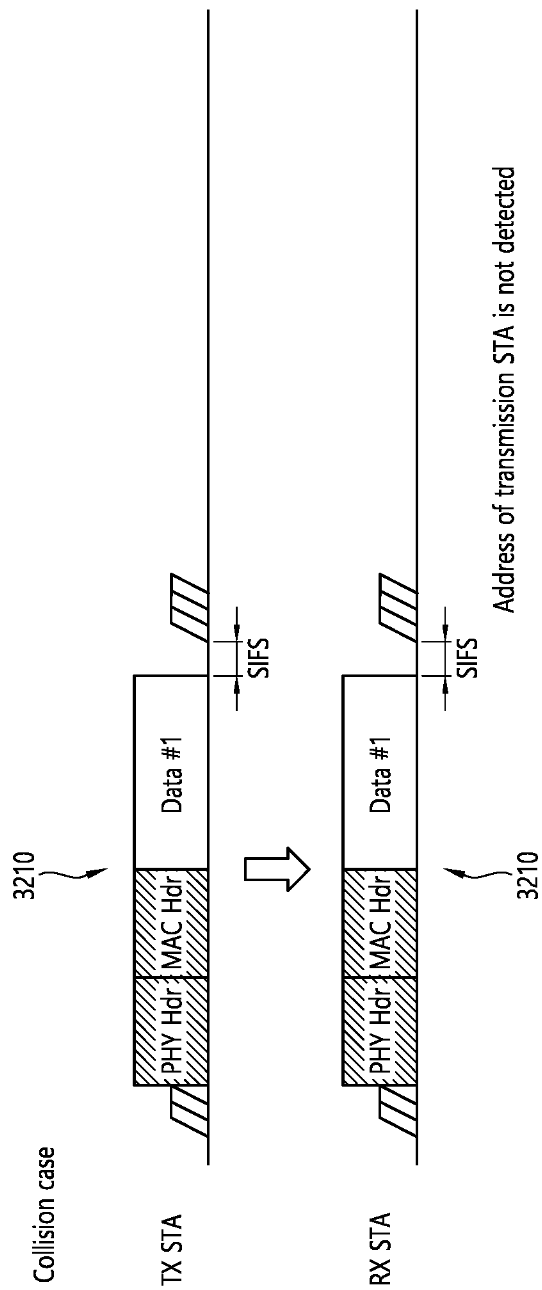
FIG. 32 shows an example in which collision occurs in OCB broadcast.

FIG. 32 shows an example in which collision occurs in OCB broadcast.

Referring to FIG. 32, a transmitting STA may acquire a TXOP. The transmitting STA may prepare for the multi-frame transmission within the TXOP. After transmitting the first NGV PPDU 3210, the transmitting STA may determine whether the channel is busy during a SIFS. When the channel is busy, a collision may occur when the transmitting STA transmits a second NGV PPDU (not shown). Accordingly, the transmitting STA may not perform the multi-frame transmission. That is, the transmitting STA may not continuously transmit the NGV PPDU during the acquired TXOP. The transmitting STA may perform the channel access again. In other words, when the channel is busy, the transmitting STA may cancel/stop the multi-frame transmission.

The receiving STA may not perform the channel access during the TXOP acquired by the transmitting STA. After receiving the first NGV PPDU 3210, the receiving STA may wait for the second NGV PPDU. If the receiving STA waits for the second NGV PPDU even when no more frames are received, resource waste may occur. Therefore, after receiving the first NGV PPDU 3210, the receiving STA may ignore the TXOP and perform the channel access again if a frame including the frame transmitted from the transmitting STA (i.e., the second NGV PPDU) is not received during a SIFS. For example, the receiving STA may check whether a PPDU is received from the transmitting STA based on a transmitter address (TA) included in the received PPDU.

Figure 33:
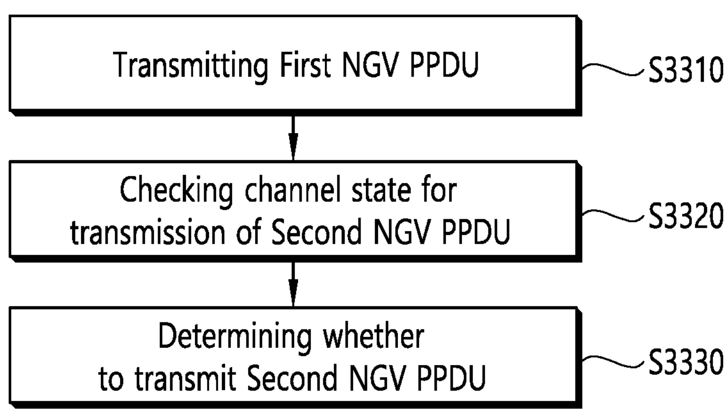
FIG. 33 is a flowchart for explaining the operation of a transmitting STA.

FIG. 33 is a flowchart for explaining the operation of a transmitting STA.

Referring to FIG. 33, in step S3310, the transmitting STA may transmit a first NGV PPDU. According to an embodiment, the transmitting STA may transmit a first NGV PPDU among a plurality of NGV PPDUs for the multi-frame transmission mode.

According to an embodiment, the transmitting STA may support the OCB mode. The transmitting STA may operate in OCB broadcast (or OCB broadcast mode).

According to an embodiment, the transmitting STA may support a multi-frame transmission mode. For example, the transmitting STA may operate in OCB broadcast and may operate in a multi-frame transmission mode. For example, the multi-frame transmission mode may include a mode in which a plurality of NGV PPDUs are transmitted within a transmission opportunity (TXOP) duration. For example, when the transmitting STA operates as an OCB broadcast, the transmitting STA may not receive the ACK frame in the multi-frame transmission mode. As an example, the plurality of NGV PPDUs may include a first NGV PPDU and a second NGV PPDU.

According to an embodiment, the transmitting STA may obtain a TXOP before transmitting the first NGV PPDU. The transmitting STA may transmit a plurality of NGV PPDUs in a multi-frame transmission mode within the obtained TXOP period. Accordingly, the transmitting STA may prepare to transmit the plurality of NGV PPDUs after obtaining the TXOP. For example, the transmitting STA may transmit a first NGV PPDU among the plurality of NGV PPDUs.

For example, the plurality of NGV PPDUs may be transmitted through a 5.9 GHz band based on a frequency spacing of 156.25 kHz. That is, the plurality of NGV PPDUs may be transmitted through a 5.9 GHz band based on a frequency spacing of 156.25 kHz in the multi-frame transmission mode.

For example, the bandwidth of the plurality of NGV PPDUs may be set to either 10 MHz or 20 MHz.

In step S3320, the transmitting STA may check a channel state for transmission of the second NGV PPDU. According to an embodiment, after the first NGV PPDU is transmitted, the transmitting STA may identify a channel state for transmission of the second NGV PPDU among the plurality of NGV PPDUs.

For example, the transmitting STA may perform energy detection or guard interval detection to check the channel state. That is, the transmitting STA may identify the channel state for transmission of the second NGV PPDU based on energy detection or guard interval detection.

For example, after the first NGV PPDU is transmitted, the transmitting STA may check the channel state for a specified period (or specified interval). For example, the designated period/interval may include a SIFS, one slot, a PIFS, an AIFS, or a DIFS. For example, the designated period/interval may include an interval between frames transmitted in the multi-frame transmission mode.

For example, the transmitting STA may check/determine the channel state as either busy (state) or idle (state).

In step S3330, the transmitting STA may determine whether to transmit the second NGV PPDU. According to an embodiment, the transmitting STA may determine whether to transmit the second NGV PPDU based on a channel state for transmitting the second NGV PPDU.

For example, the transmitting STA may cancel transmission of the second NGV PPDU based on the busy state of the channel state. That is, before transmitting the second NGV PPDU, the transmitting STA may determine a channel state for transmitting the second NGV PPDU. The transmitting STA may cancel transmission of the second NGV PPDU based on the busy state of the channel state. In other words, the transmitting STA may not transmit the second NGV PPDU. Also, the transmitting STA may terminate the multi-frame transmission mode based on the busy state of the channel state. The transmitting STA may terminate the multi-frame transmission mode and cancel transmission of a plurality of NGV PPDUs that have not yet been transmitted. In other words, the transmitting STA may terminate the multi-frame transmission mode and may not transmit a plurality of NGV PPDUs that have not yet been transmitted.

The transmitting STA may perform channel access based on the cancellation of transmission of the second NGV PPDU. Since the transmitting STA cancels transmission of the second NGV PPDU, it may perform channel access to transmit the second NGV PPDU (or an NGV PPDU including the same data as the second NGV PPDU).

For example, the transmitting STA may transmit the second NGV PPDU based on the channel state being the idle state. Thereafter, after transmitting the second NGV PPDU, the transmitting STA may transmit a plurality of NGV PPDUs that have not been transmitted through the same process. That is, when the channel state is maintained in the idle state within the TXOP, the transmitting STA may transmit a plurality of NGV PPDUs for the multi-frame transmission mode.

Figure 34:
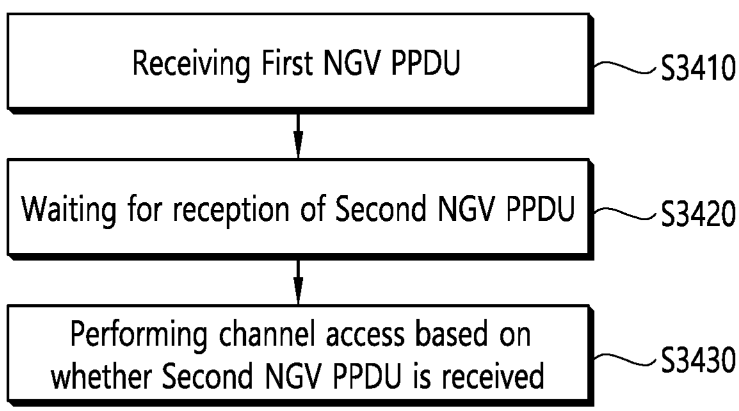
FIG. 34 is a flowchart illustrating an operation of a receiving STA.

FIG. 34 is a flowchart illustrating an operation of a receiving STA.

Referring to FIG. 34, in step S3410, the receiving STA may receive a first NGV PPDU. According to an embodiment, the receiving STA may receive a first NGV PPDU from among a plurality of NGV PPDUs for the multi-frame transmission mode. For example, the multi-frame transmission mode may include a mode in which a plurality of NGV PPDUs are transmitted within a transmission opportunity (TXOP) duration. As an example, the plurality of NGV PPDUs may include a first NGV PPDU and a second NGV PPDU.

According to an embodiment, the transmitting STA may obtain a TXOP before transmitting the first NGV PPDU. The transmitting STA may transmit a plurality of NGV PPDUs in a multi-frame transmission mode within the obtained TXOP period. Accordingly, the receiving STA may receive a plurality of NGV PPDUs transmitted through the multi-frame transmission mode within the TXOP period obtained by the transmitting STA. For example, the receiving STA may receive a first NGV PPDU from among the plurality of NGV PPDUs.

For example, the plurality of NGV PPDUs may be received through a 5.9 GHz band based on a frequency spacing of 156.25 kHz. That is, the plurality of NGV PPDUs may be received through a 5.9 GHz band based on a frequency spacing of 156.25 kHz in the multi-frame transmission mode.

For example, the bandwidth of the plurality of NGV PPDUs may be set to either 10 MHz or 20 MHz.

In step S3420, the receiving STA may wait for reception of a second NGV PPDU from among the plurality of NGV PPDUs. According to an embodiment, after the first NGV PPDU is received, the receiving STA may wait for reception of a second NGV PPDU from among the plurality of NGV PPDUs.

For example, after the first NGV PPDU is received, the receiving STA may wait for reception of the second NGV PPDU for a specified period (or specified interval). For example, the designated period/interval may include a SIFS, one slot, a PIFS, an AIFS, or a DIFS. For example, the designated period/interval may include an interval between frames transmitted in a multi-frame transmission mode.

In step S3430, the receiving STA may perform channel access based on whether the second NGV PPDU is received. For example, the receiving STA may perform channel access based on that the second NGV PPDU is not received during a specified period (or a specified interval). As an example, the receiving STA may perform channel access even when the TXOP period obtained by the transmitting STA has not ended.

For another example, the receiving STA may not perform channel access based on the reception of the second NGV PPDU within a specified period (or a specified interval).

The technical features of the present specification described above may be applied to various devices and methods. For example, the above-described technical features of the present specification may be performed/supported through the apparatus of FIGS. 1 and/or 19. For example, the above-described technical features of the present specification may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, an apparatus herein includes a memory and a processor operatively coupled to the memory. The processor may be configured to: transmit a first Next Generation V2X (NGV) Physical Protocol Data Unit (PPDU) among a plurality of NGV PPDUs configured for a multiple-frame transmission mode; after transmitting the first NGV PPDU, identify a channel state for transmission of a second NGV PPDU among the plurality of NGV PPDUs; and determine whether to transmit the second NGV PPDU based on the channel state, wherein the plurality of NGV PPDUs are transmitted through a 5.9 GHz band based on a frequency spacing of 156.25 kHz in the multi-frame transmission mode.

The technical features of the present specification may be implemented based on a computer readable medium (CRM). For example, the CRM proposed by the present specification may store instructions that perform operations comprising transmitting a first NGV PPDU of a plurality of NGV PPDU (Next Generation V2X Physical Protocol Data Unit) for a multiple frame transmission mode (multiple frame transmission mode); after the first NGV PPDU is transmitted, identifying a channel state for transmission of a second NGV PPDU among the plurality of NGV PPDUs; and determining whether to transmit the second NGV PPDU based on the channel state, wherein the plurality of NGV PPDUs are based on a frequency spacing of 156.25 kHz in the multi-frame transmission mode through a 5.9 GHz band. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

The above-described technical characteristics of the present specification may be applied to various applications or business models. For example, the UE, Terminal, STA, Transmitter, Receiver, Processor, and/or Transceiver, and so on, that are described in the present specification may be applied to vehicles that support autonomous driving or prior art vehicles that support autonomous driving.

Figure 35:
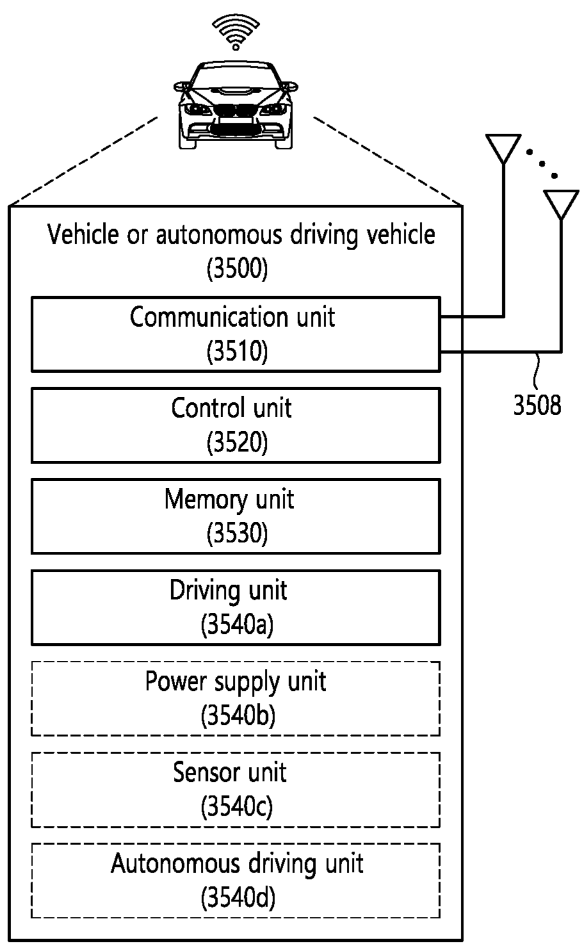
FIG. 35 shows a vehicle or an autonomous driving vehicle applied to the present specification.

FIG. 35 shows a vehicle or an autonomous driving vehicle applied to the present specification. The vehicle or autonomous driving vehicle may be implemented by a mobile robot, a car, a train, a manned/unmanned Aerial Vehicle (AV), a ship, and so on.

A memory unit 3530 shown in FIG. 35 may be included in the memory(s) 112, 122 shown in FIG. 1. Additionally, a communication unit 3510 shown in FIG. 35 may be include in the transceiver(s) 113, 123 and/or processor(s) 111, 121 shown in FIG. 1. Furthermore, the remaining devices that are shown in FIG. 35 may be included in the processor(s) 111, 121 shown in FIG. 1.

Referring to FIG. 35, a vehicle or autonomous driving vehicle 3500 may include an antenna unit 3508, a communication unit 3510, a control unit 3520, a memory unit 3530, a driving unit **3540*a*, a power supply unit 3540*b*, a sensor unit 3540*c*, and/or an autonomous driving unit 3540*d*. The antenna unit 3508 may be configured as a part of the communication unit 3510**.

The communication unit 3510 may transmit and receive signals (e.g., data and control signals) to and from external devices such as other vehicles, BSs (e.g., gNBs and road side units), and servers. The control unit 3520 may perform various operations by controlling elements of the vehicle or the autonomous driving vehicle 3500. The control unit 3520 may include an Electronic Control Unit (ECU). The driving unit **3540*a* may cause the vehicle or the autonomous driving vehicle 3500 to drive on a road. The driving unit 3540*a* may include an engine, a motor, a powertrain, a wheel, a brake, a steering device, and so on. The power supply unit 3540*b* may supply power to the vehicle or the autonomous driving vehicle 3500 and include a wired/wireless charging circuit, a battery, and so on. The sensor unit 3540*c* may acquire a vehicle state, ambient environment information, user information, and so on. The sensor unit 3540*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 3540*d*** may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 3510 may receive map data, traffic information data, and so on, from an external server. The autonomous driving unit **3540*d* may generate an autonomous driving path and a driving plan from the obtained data. The control unit 3520 may control the driving unit 3540***a* such that the vehicle or the autonomous driving vehicle 3500 may move along the autonomous driving path according to the driving plan (e.g., speed/direction control). In the middle of autonomous driving, the communication unit 3510 may aperiodically/periodically acquire recent traffic information data from the external server and acquire surrounding traffic information data from neighboring vehicles. In the middle of autonomous driving, the sensor unit 3540*c* may obtain a vehicle state and/or surrounding environment information. The autonomous driving unit 3540*d* may update the autonomous driving path and the driving plan based on the newly obtained data/information. The communication unit 3510 may transfer information about a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

An example of the present specification includes an example of FIG. 36, which will hereinafter be described in detail.

Figure 36:
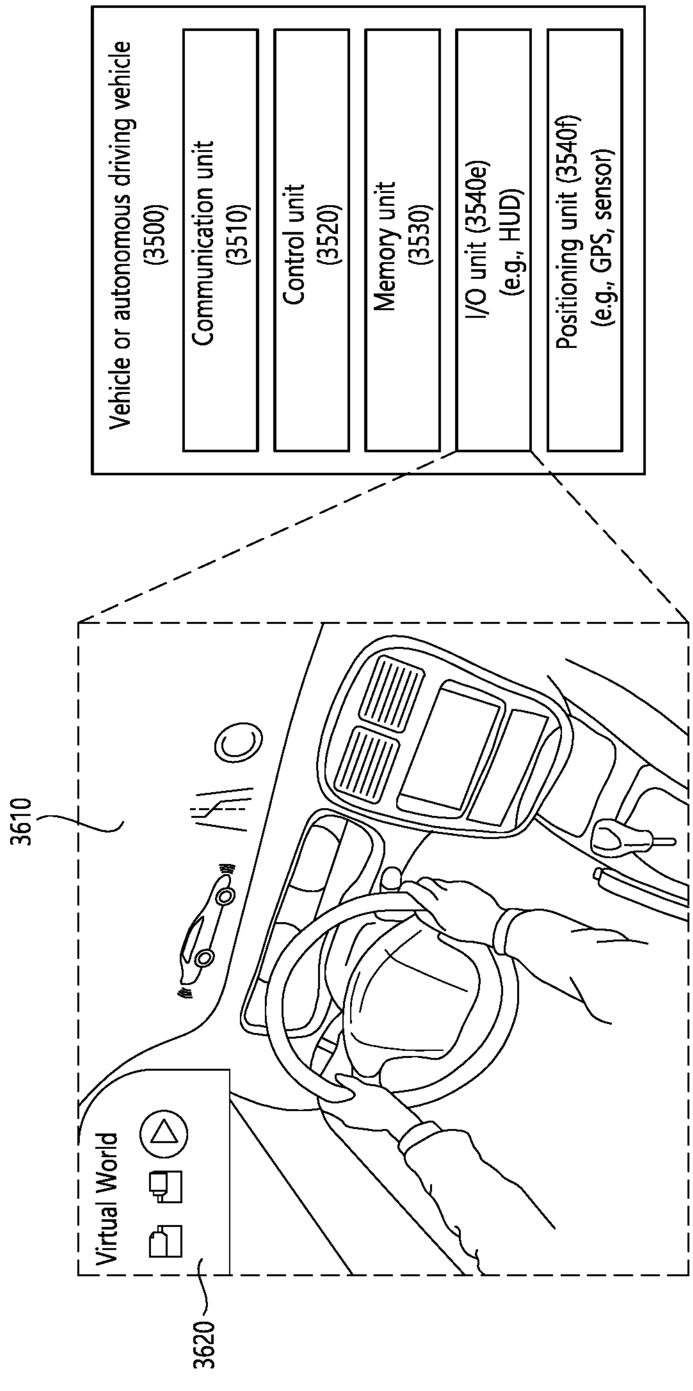
FIG. 36 shows an example of a vehicle that is applied to the present specification.

FIG. 36 shows an example of a vehicle that is applied to the present specification. The vehicle may be implemented as a transport means, an aerial vehicle, a ship, and so on.

Referring to FIG. 36, a vehicle 3500 may include a communication unit 3510, a control unit 3520, a memory unit 3530, an input/output (I/O) unit 3540*e*, and a positioning unit 3540*f*. Each block/unit/device shown in FIG. 36 may be the same as each block/unit/device shown in FIG. 35, respectively.

The communication unit 3510 may transmit and receive signals (e.g., data and control signals) to and from external devices such as other vehicles or BSs. The control unit 3520 may perform various operations by controlling constituent elements of the vehicle 3500. The memory unit 3530 may store data/parameters/programs/code/commands for supporting various functions of the vehicle 3500. The I/O unit 3540*e* may output an AR/VR object based on information within the memory unit 3530. The I/O unit 3540*e* may include a HUD. The positioning unit 3540*f* may acquire information about the position of the vehicle 3500. The position information may include information about an absolute position of the vehicle 3500, information about the position of the vehicle 3500 within a traveling lane, acceleration information, and information about the position of the vehicle 3500 from a neighboring vehicle. The positioning unit 3540*f* may include a GPS and various sensors.

As an example, the communication unit 3510 of the vehicle 3500 may receive map information and traffic information from an external server and store the received information in the memory unit 3530. The positioning unit 3540*f* may obtain the vehicle position information through the GPS and various sensors and store the obtained information in the memory unit 3530. The control unit 3520 may generate a virtual object based on the map information, traffic information, and vehicle position information and the I/O unit 3540*e* may display the generated virtual object in a window in the vehicle 3610, 3620. The control unit 3520 may determine whether the vehicle 3500 normally drives within a traveling lane, based on the vehicle position information. If the vehicle 3500 abnormally exits from the traveling lane, the control unit 3520 may display a warning on the window in the vehicle through the I/O unit 3540*e*. In addition, the control unit 3520 may broadcast a warning message regarding driving abnormity to neighboring vehicles through the communication unit 3510. According to situation, the control unit 3520 may transmit the vehicle position information and the information about driving/vehicle abnormality to related organizations.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

receiving, by a receiving station (STA), a first Next Generation V2X (NGV) Physical Protocol Data Unit (PPDU) among a plurality of NGV PPDUs from a transmitting STA operating based on an Outside the Context of a Basic service set (OCB) broadcast mode, wherein the first NGV PPDU is received during a transmission opportunity (TXOP) obtained by the transmitting STA, wherein the receiving STA initiates deferring channel access after receiving the first NGV PPDU;

after receiving the first NGV PPDU, determining whether a second NGV PPDU among the plurality of NGV PPDUs is received by the receiving STA within the TXOP; and determining, by the receiving STA, whether to disregard the TXOP based on whether the second NGV PPDU is received within the TXOP, wherein the first NGV PPDU is received through a 5.9 GHZ band based on a frequency spacing of 156.25 kHz, wherein the first NGV PPDU includes a legacy signal (L-SIG) field, a repeated legacy signal (RL-SIG) field being contiguous to the L-SIG field, an NGV signal (NGV-SIG) field being contiguous to the RL-SIG field, an NGV Long Training Field (LTF), and a plurality of mid-ambles, wherein the NGV-SIG field includes a physical version Indicator field identifying a physical version of the first NGV PPDU, a mid-amble periodicity field identifying a periodicity of the plurality of mid-ambles, and an LTF format field indicating one of NGV-LTF-1x or NGV-LTF-2x.

2. The method of claim 1, wherein the NGV LTF is defined based on {1, 0, 1, 0, 1, 0, 1, 0, 1, 0, 1, 0, 1, 0, 1, 0, 1, 0, 1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1} when the LTF format field indicates the NGV-LTF-1x.

3. The method of claim 1, wherein the NGV LTF is defined based on {1, 1, 1, 1, 1, 1, 1, 1, 1, 1, 1, 1, 1, 1, 1, 1, 1, 1, 1, 1, 1, 1, 1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1} when the LTF format field indicates the NGV-LTF-2x.

4. A receiving station (STA) in a wireless local area network (WLAN) system, the receiving STA comprising:

at least one processor; and at least one computer memory operatively connected to the at least one processor and storing instructions that, based on being executed by the at least one processor, perform operations comprising:

receiving a first Next Generation V2X (NGV) Physical Protocol Data Unit (PPDU) among a plurality of NGV PPDUs from a transmitting STA operating based on an Outside the Context of a Basic service set (OCB) broadcast mode, wherein the first NGV PPDU is received during a transmission opportunity (TXOP) obtained by the transmitting STA, wherein the receiving STA initiates deferring channel access after receiving the first NGV PPDU;

after receiving the first NGV PPDU, determining whether a second NGV PPDU among the plurality of NGV PPDUs is received by the receiving STA within the TXOP; and determining whether to disregard the TXOP based on whether the second NGV PPDU is received within the TXOP, wherein the first NGV PPDU is received through a 5.9 GHz band based on a frequency spacing of 156.25 kHz, wherein the first NGV PPDU includes a legacy signal (L-SIG) field, a repeated legacy signal (RL-SIG) field being contiguous to the L-SIG field, an NGV signal (NGV-SIG) field being contiguous to the RL-SIG field, an NGV Long Training Field (LTF), and a plurality of mid-ambles, wherein the NGV-SIG field includes a physical version Indicator field identifying a physical version of the first NGV PPDU, a mid-amble periodicity field identifying a periodicity of the plurality of mid-ambles, and an LTF format field indicating one of NGV-LTF-1x or NGV-LTF-2x.

5. The receiving STA of claim 4, wherein the LTF format field indicates the NGV-LTF-1×, and the NGV LTF is defined based on {1, 0, 1, 0, 1, 0, 1, 0, 1, 0, 1, 0, 1, 0, 1, 0, 1, 0, 1, 0, 1, 0, 1, 0, 1, 0, 1, 0, 0, 0, −1, 0, 1, 0, −1, 0, −1, 0, −1, 0, −1, 0, −1, 0, 1, 0, −1, 0, −1, 0, −1, 0, 1, 0, 1, 0, −1}.

6. The receiving STA of claim 4, wherein the LTF format field indicates the NGV-LTF-2×, and the NGV LTF is defined based on {1, 1, 1, 1, 1, 1, 1, 1, 1, 1, 1, 1, 1, 1, 1, 1, 1, 1, 1, 1, 1, 1, 1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1}.

* * * * *